United States Patent
Purdy et al.

(10) Patent No.: US 8,641,933 B2
(45) Date of Patent: Feb. 4, 2014

(54) COMPOSITE CRYSTAL COLLOIDAL ARRAY WITH PHOTOCHROMIC MEMBER

(75) Inventors: Sean Purdy, Cincinnati, OH (US); Jessica M. Williamson, Wilder, KY (US); Anil Kumar, Murrysville, PA (US); Noel R. Vanier, Wexford, PA (US); Wei Wang, Allison Park, PA (US); Shan Cheng, Sewickley, PA (US); Xiangling Xu, Pittsburgh, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 70 days.

(21) Appl. No.: 13/242,038

(22) Filed: Sep. 23, 2011

(65) Prior Publication Data
US 2013/0075676 A1    Mar. 28, 2013

(51) Int. Cl.
*G02B 5/23* (2006.01)
*G02F 1/03* (2006.01)
*G02F 1/07* (2006.01)

(52) U.S. Cl.
USPC ........ 252/586; 250/201.1; 252/600; 359/241; 359/290; 359/296; 427/162

(58) Field of Classification Search
USPC ........... 252/583, 586, 600; 283/107; 359/288, 359/350, 359, 566, 290, 296, 241; 427/7, 427/162, 256; 385.5; 428/52, 195.1, 327, 428/413, 423.1, 446, 457, 480; 106/287.35; 250/201.1
See application file for complete search history.

(56) References Cited

U.S. PATENT DOCUMENTS

| | | |
|---|---|---|
| 2,940,830 A | 6/1960 | Thornhill |
| 3,772,200 A | 11/1973 | Livesay |
| 4,053,433 A | 10/1977 | Lee |
| 4,390,452 A | 6/1983 | Stevens |
| 4,681,750 A | 7/1987 | Johnson et al. |
| 4,833,172 A | 5/1989 | Schwarz et al. |
| 4,861,644 A | 8/1989 | Young et al. |
| 5,122,905 A | 6/1992 | Wheatley et al. |
| 5,196,262 A | 3/1993 | Schwarz et al. |
| 5,266,238 A | 11/1993 | Haacke et al. |
| 5,281,370 A | 1/1994 | Asher et al. |
| 5,330,685 A | 7/1994 | Panzer et al. |
| 5,527,386 A | 6/1996 | Statz |
| 5,618,586 A | 4/1997 | Swarup et al. |
| 5,624,731 A | 4/1997 | Desjardins |
| 5,711,884 A | 1/1998 | Asher et al. |
| 5,783,120 A | 7/1998 | Ouderkirk et al. |
| 5,824,733 A | 10/1998 | Dobert et al. |

(Continued)

OTHER PUBLICATIONS

Hiroshi Nakamura, Masahiko Ishii, Optical Properties of Colloidal Crystalline Arrays Composed of Hollow Polystyrene Spheres, Journal of Applied Polymer Science, vol. 103, 2364-2368, 2007, Wiley Periodicals, Inc.*

(Continued)

*Primary Examiner* — Bijan Ahvazi
(74) *Attorney, Agent, or Firm* — Julie Meder

(57) ABSTRACT

The invention includes a composite material for use in a security device including a radiation diffracting component that exhibits a first optical effect and a photochromic component that exhibits a second optical effect. The composite material is particularly suited for use in authenticating articles, such as currency.

27 Claims, 5 Drawing Sheets

(56) References Cited

U.S. PATENT DOCUMENTS

| | | | |
|---|---|---|---|
| 5,854,078 | A | 12/1998 | Asher et al. |
| 5,932,309 | A | 8/1999 | Smith et al. |
| 6,114,023 | A | 9/2000 | Schwarz et al. |
| 6,165,389 | A | 12/2000 | Asher et al. |
| 6,187,599 | B1 | 2/2001 | Asher et al. |
| 6,299,979 | B1 | 10/2001 | Neubauer et al. |
| 6,337,131 | B1 | 1/2002 | Rupaner et al. |
| 6,589,452 | B2 * | 7/2003 | Asher et al. ............ 252/600 |
| 6,647,649 | B2 | 11/2003 | Hunt et al. |
| 6,753,191 | B2 | 6/2004 | Asher et al. |
| 6,782,115 | B2 | 8/2004 | Decker et al. |
| 6,894,086 | B2 | 5/2005 | Munro et al. |
| 7,008,567 | B2 | 3/2006 | Foulger et al. |
| 7,217,746 | B2 | 5/2007 | Munro et al. |
| 7,291,389 | B1 | 11/2007 | Bitler et al. |
| 7,682,530 | B2 | 3/2010 | Purdy et al. |
| 2002/0054680 | A1 | 5/2002 | Huang et al. |
| 2002/0143073 | A1 | 10/2002 | Jiang et al. |
| 2003/0174560 | A1 | 9/2003 | Dahmen et al. |
| 2004/0253443 | A1 | 12/2004 | Anselmann et al. |
| 2005/0067497 | A1 | 3/2005 | Jones et al. |
| 2005/0228072 | A1 | 10/2005 | Winkler et al. |
| 2006/0137601 | A1 | 6/2006 | Miguez et al. |
| 2006/0191442 | A1 | 8/2006 | He et al. |
| 2006/0235086 | A1 | 10/2006 | Maskaly et al. |
| 2006/0237541 | A1 * | 10/2006 | Downing ............ 235/462.01 |
| 2006/0254315 | A1 | 11/2006 | Winkler et al. |
| 2007/0100026 | A1 | 5/2007 | Munro et al. |
| 2007/0165903 | A1 | 7/2007 | Munro et al. |
| 2008/0026217 | A1 | 1/2008 | Kim et al. |
| 2008/0188381 | A1 | 8/2008 | Xu et al. |
| 2009/0038512 | A1 * | 2/2009 | Xu et al. ............ 106/287.35 |
| 2009/0155545 | A1 | 6/2009 | Purdy et al. |
| 2009/0301191 | A1 | 12/2009 | Dick et al. |
| 2009/0317623 | A1 | 12/2009 | Purdy et al. |
| 2010/0045027 | A1 * | 2/2010 | Whiteman ............ 283/107 |
| 2010/0245044 | A1 | 9/2010 | Dietemann |
| 2010/0315703 | A1 | 12/2010 | Purdy et al. |
| 2010/0328764 | A1 | 12/2010 | Munro et al. |
| 2011/0135888 | A1 | 6/2011 | Xu et al. |
| 2011/0267677 | A1 | 11/2011 | Xu et al. |

OTHER PUBLICATIONS

Endo et al. Colorimetric detection of volatile organic compounds using a colloidal crystal-based chemical sensor for environmental applications, Sensors and Actuators B, 2007, pp. 589-595, vol. 125.

Nagao et al. Preparation of highly monodisperse poly(methyl methacrylate) particles incorporating fluorescent rhodamine 6G for colloidal crystals, Journal of Colloid and Interface Science, 2006, pp. 232-237, vol. 298.

Fudouzi et al. Colloidal Crystals with Tunable Colors and Their Use as Photonic Papers, Langmuir, 2003, pp. 9653-9660, vol. 19, American Chemical Society.

Rao et al, Comparative studies of the physical and hydrophobic properties of TEOS based silica aerogels using different co-precursors, Science and Technology of Advanced Materials, 2003, pp. 509-515, vol. 4.

Hotta, Coated polystyrene particles as templates for ordered macroporous silica structures with controlled wall thickness, J. Mater. Chem., 2003, pp. 496-501, vol. 13.

Xu et al. Synthesis and Utilization of Monodisperse Superparamagnetic Colloidal Particles for Magnetically Controllable Photonic Crystals, Chem. Mater., 2002, pp. 1249-1256, vol. 14.

Xu et al. Mesoscopic Monodisperse Ferromagnetic Colloids Enable Magnetically Controlled Photonic Crystals, J. Am. Chem. Soc., 2002, pp. 13864-13868, vol. 124.

Zeng et al. Urea sensing materials via solidified crystalline colloidal arrays, Sensors and Actuators B, 2002, pp. 273-276, vol. 81.

Zeng et al. Preparation and dynamic viscoelastic properties of strengthened solidified colloidal crystals, Reactive & Functional Polymers, 2002, pp. 39-44, vol. 53.

Xu et al. Superparamagnetic Photonic Crystals, Advanced Materials, Nov. 16, 2001, pp. 1681-1684, vol. 13, No. 22.

Jethmalani et al., "Diffraction of Visible Light by Ordered Monodisperse Silica-Poly(methyl acrylate) Composite Films," Chem. Mater, 1996, pp. 2138-2146, vol. 8.

Pfaff et al. Angle-Dependent Optical Effects Deriving from Submicron Structures of Films and Pigments, Chemical Review 1999, pp. 1963-1981, vol. 99.

Velev et al. Porous silica via colloidal crystallization, Nature, Oct. 2, 1997, pp. 447-448, vol. 389.

Sperling et al. Interpenetrating Polymer Networks, pp. 427-431.

* cited by examiner

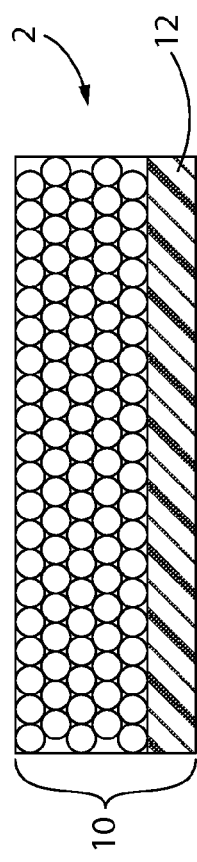
FIG.2
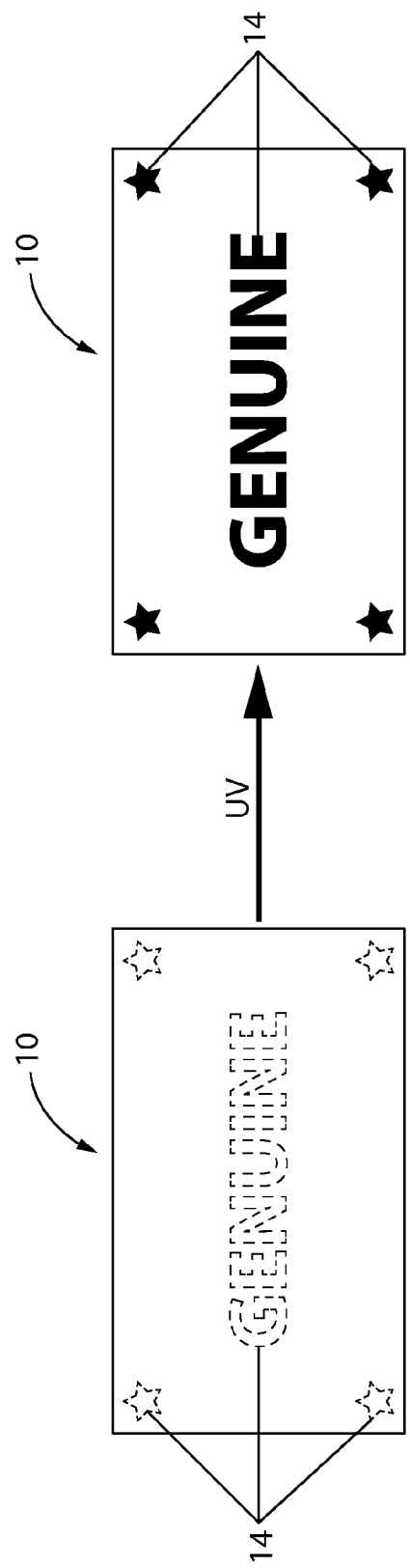
FIG.3a
FIG.3b

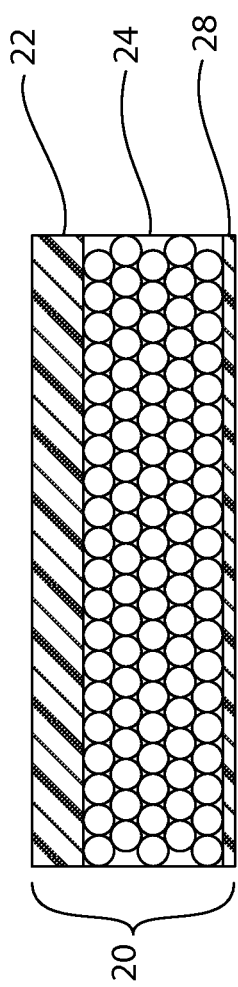
FIG. 4
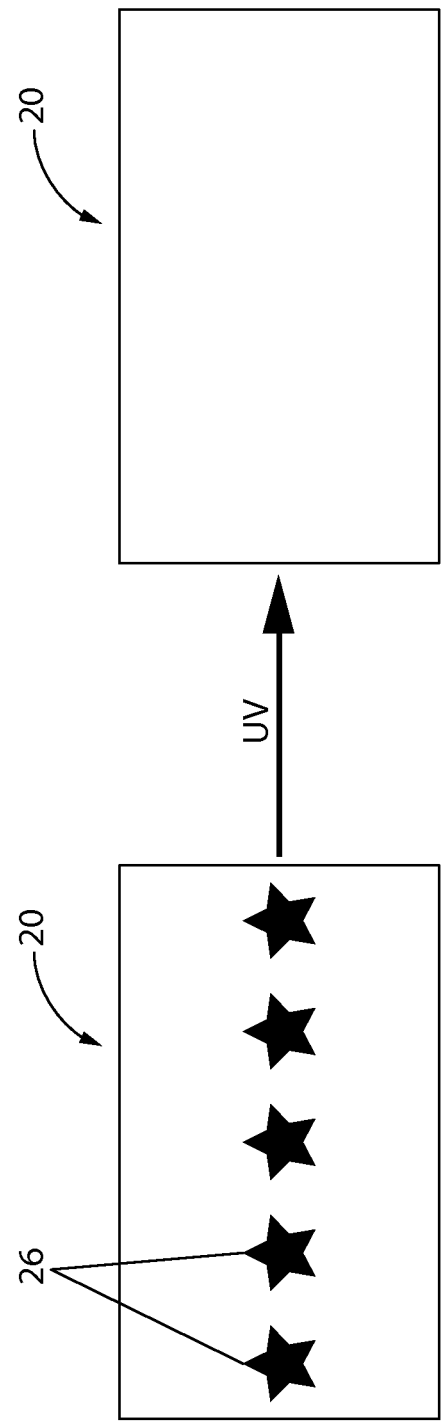
FIG. 5a
FIG. 5b

COMPOSITE CRYSTAL COLLOIDAL ARRAY WITH PHOTOCHROMIC MEMBER

FIELD OF THE INVENTION

This invention relates to composite material having multiple security features. In particular, this invention relates to a composite material having a radiation diffraction component and a photochromic component, wherein the composite material exhibits two optical effects.

BACKGROUND OF THE INVENTION

Radiation diffracting materials based on crystalline colloidal arrays have been used for a variety of purposes. A crystalline colloidal array (CCA) is a three-dimensional ordered array of monodispersed colloidal particles, which may be composed of inorganic or organic materials. Colloidal dispersions of particles can form crystalline structures having lattice spacings that are comparable to the wavelength of ultraviolet, visible, or infrared radiation. These structures have been used for filtering narrow bands of selected wavelengths from a broad spectrum of incident radiation while permitting the transmission of adjacent wavelengths of radiation. Other CCAs have been used when fixed in a matrix as colorants, where the fixed array diffracts radiation in the visible spectrum. Such colorant CCAs exhibit a goniochromatic effect when applied to a substrate.

More recently, radiation diffracting materials have been used for producing images with unique optical effects. Such radiation diffracting materials have been proposed for use in security devices for authenticating documents or as security applications. Secure documents, such as bank notes, bonds, checks, and letters of credit, as well as legal documents and identification documents now frequently carry optically active devices, some exhibiting an angularly dependent colored reflection. The use of radiation diffracting materials in security devices has been relatively limited and generally restricted to simple angular dependent colored reflection, which is determined upon viewing the article bearing the device at varying angles.

SUMMARY OF THE INVENTION

A need for additional security devices in the field of authenticating or security applications is achievable using the composite material of the present invention.

The present invention includes a composite material comprising a radiation diffracting component that exhibits a first optical effect and a photochromic component that exhibits a second optical effect. Also included in the present invention is a security device that includes a radiation diffracting component and a photochromic component, wherein the radiation reflected by the radiation diffracting component is affected by absorbance of light by said photochromic component. Also included in the present invention is a method of authenticating an article, including steps of applying a composite material to the article, where the composite material includes a first component that diffracts radiation and a second component that is photochromic. The composite material bears an image. Upon exposure of the article bearing the composite material to a first wavelength, the radiation diffracting component exhibits a first optical effect. Upon exposing the article bearing the composite material to ultraviolet radiation, the photochromic component exhibits a second optical effect, whereby the image in the composite material changes.

BRIEF DESCRIPTION OF THE DRAWINGS

FIG. 2 is a cross-section of the composite material of the present invention;

FIG. 3a is a plan view of the composite material of the present invention;

FIG. 3b is a plan view of the composite material shown in FIG. 3a following exposure to UV radiation;

FIG. 4 is a cross-section of another embodiment of the composite material of the present invention;

FIG. 5a is a plan view of the composite material of the present invention;

FIG. 5b is a plan view of the composite material shown in FIG. 5a following exposure to UV radiation;

DETAILED DESCRIPTION OF THE INVENTION

Figure 1:
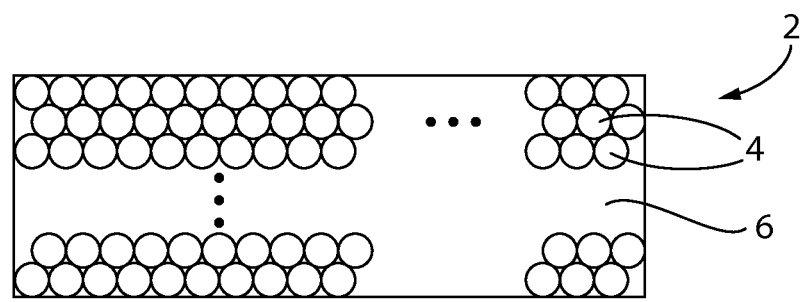
FIG. 1 is a cross-section of a radiation diffracting component made in accordance with the present invention.

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is meant to include homopolymer, copolymer, and oligomer. The term "metal" includes metals, metal oxides, and metalloids. The term "infuse" and related terms (such as infusion) refer to penetration from a liquid phase.

The present invention includes a composite material, which is particularly suited for use as a security device and protecting legal, financial, and identification documents, as well as authenticating articles. The composite material of the present invention includes at least two security devices, one being a radiation diffraction component and the other being a photochromic component. These two security devices included in a single composite material provide two optical effects detectable at two different wavelengths. The term "wavelength" is meant to include a band of the electromagnetic radiation spectrum, unless specifically stated otherwise. For example, reference to a wavelength of 600 nm may include 595 to 605 nm.

The radiation diffracting component exhibits an angle dependent first optical effect that is detectable as a diffraction wavelength, which may be in the visible or invisible spectrum. The photochromic component exhibits a second optical effect comprising absorption of radiation in the visible spectrum at an absorption wavelength. The diffraction wavelength may be the same as or different from the absorption wavelength. The present invention is primarily described in relation to optical effects (diffraction and absorption) that are visible to the human eye. However, the present invention is not limited to the use in diffracting visible light. Other wavelengths of electromagnetic radiation outside the visible spectrum may be diffracted, such as ultraviolet or infrared radiation.

In one embodiment of the invention, the composite material includes a radiation diffraction component overlying or underlying a photochromic component. The photochromic component may be provided as a photochromic coating composition coated onto a substrate and/or coated onto the radiation diffracting component. In another embodiment of the invention, the photochromic component is provided within the radiation diffracting component, such as being dispersed therein. The composite material may be applied to an article in a variety of manners, such as by adhesives or the like or by being produced directly onto an article.

These features of the present invention and various embodiments of the composite material are detailed below.

Radiation Diffraction Component

In one embodiment, as shown schematically in FIG. 1, the radiation diffracting component 2 includes an ordered periodic array of particles 4 held in a polymeric matrix 6. By ordered periodic array of particles, it is meant an array of particles that diffracts radiation. Parallel layers or planes formed by the ordered periodic array of particles 4 interact with incident radiation in accordance with Bragg's law. Radiation striking the radiation diffraction component is diffracted whereby radiation at a wavelength is reflected by the planes of the particles (the diffraction wavelength) while the remainder of the radiation is transmitted through the material, as described in U.S. Pat. No. 6,894,086, incorporated herein by reference. In the visible spectrum, the diffracted light is goniochromatic, i.e. the color depends on the viewing angle. The diffraction wavelength of the light at a given angle is proportional to the distance between the Bragg planes formed by the periodic array of particles, which is proportional to the particle diameter for close-packed spheres. The diffraction wavelength also depends on the effective refractive index of the radiation diffracting material. The effective refractive index of the radiation diffraction component is closely approximated as a volume average of the refractive index of the materials of the radiation diffracting material, including the particles 4 and the matrix material 6 surrounding the particles 4. The intensity of the diffracted radiation is dependent on the refractive index variation within the radiation diffraction component as dictated by the arrangement of the particles 4 and the surrounding matrix 6. The quantity of layers present in the array and the refractive index contrast between alternating layers can also influence the diffraction intensity. More particle layers produce greater diffraction intensity. Higher refractive index contrast between alternating layers also produces greater diffraction intensity. Higher refractive index contrast between alternating layers can be achieved by using particles and matrix having a relative large difference in their respective indices of refraction. Alternatively, directionally expanding the particles and/or the matrix can alter the layered structure and increase the refractive index contrast between the layers.

Particles

Various compositions may be used for the particles, including, but not limited to, organic polymers such as polystyrene, polyurethane, acrylic polymers, alkyd polymers, polyesters, siloxane-containing polymers, polysulfides, epoxy-containing polymers and inorganic materials, such as metal oxides (e.g., alumina, silica, zinc oxide, or titanium dioxide) or semiconductors, such as silicon or composites of these materials. Alternatively, the particles may have a core-shell structure where the core can be produced from the same materials as the above-described unitary particles. The shell may be produced from the same polymers as the core material, with the polymer of the particle shell differing from the core material for a particular array of the core-shell particles. The core material and the shell material can have different indices of refraction. In addition, the refractive index of the shell may vary as a function of the shell thickness in the form of a gradient of refractive index through the shell thickness. The shell material may be non-film-forming, meaning that the shell material remains in position surrounding each particle core without forming a film of the shell material, so that the core-shell particles remain as discrete particles within the matrix. As such, the array includes at least three general regions, namely, the matrix, the particle shell, and the particle core. Alternatively, the shell material may be film-forming, such that the shell material forms a film around the cores. The core material and the shell material have different indices of refraction. In addition, the refractive index of the shell may vary as a function of the shell thickness in the form of a gradient of refractive index through the shell thickness. The refractive index gradient may be a result of a gradient in the composition of the shell material through the shell thickness.

Typically, the particles are generally spherical. For core-shell particles, the diameter of the core may constitute 5 to 95% of the total particle diameter with the shell constituting the balance of the particle diameter and having a radial thickness dimension.

In another embodiment, the particles may have a hollowed-out structure. By hollowed-out structure, it is meant that an original central portion of the particle is removed, such as by dissolution, or etching, or the like. The original particle may have had a unitary structure or a core-shell structure.

In one embodiment, the particles with a unitary structure (not core-shell) are produced via emulsion polymerization in the presence of a surfactant, yielding a dispersion of charged particles. Suitable surfactants for dispersion of latex particles include, but are not limited to, sodium styrene sulfonate, sodium 1-allyloxy-2-hydroxypropyl sulfonate (commercially available as Sipomer COPS-I from Rhodia Corporation), acrylamide propyl sulfonate, and sodium allyl sulfonate. Particularly useful surfactants are those that are minimally soluble in the dispersing fluid (e.g., water) of the particle dispersion. The charged particles are purified from the dispersion by techniques, such as ultra-filtration, dialysis, or ion-exchange to remove undesired materials, such as unreacted monomer, small polymers, water, initiator, surfactant, unbound salt, and grit (agglomerated particles) to produce a monodispersion of charged particles. Ultra-filtration is particularly suitable for purifying charged particles. When the particles are in a dispersion with other materials, such as salts or by-products, the repelling forces of the charged particles can be mitigated; therefore, the particle dispersion is purified to substantially contain only the charged particles, which then readily repel each other and form an ordered array.

Similarly, core-shell particles may be produced by dispersing core monomers with initiators in solution to produce particle cores. Shell monomers are added to the particle core dispersion, along with an emulsifier and/or surfactant (as described above for unitary particles), such that the shell monomers polymerize onto the particle cores. A dispersion of the core-shell particles is purified, as described above, to produce a dispersion of substantially only the charged core-shell particles, which then form an ordered array on a substrate when applied thereto. In another embodiment, the particles are hollow. By hollow particles, it is meant particles that include a shell and define an interior region, which may be filled with air or other material. Typically, the hollow particles are generally spherical. The diameter of the particles may be about 200 to 700 nm and the thickness of the shells may be about 20 to 100 nm.

The hollow particles may be produced from various compositions, including, but not limited to, organic polymers, such as polystyrene, polyurethane, acrylic polymers, alkyd polymers, polyesters, siloxane-containing polymers, polysulfides, epoxy-containing polymers, and inorganic materials, such as metal oxides (e.g., alumina, silica, zinc oxide, or titanium dioxide) or semi-conductors, such as silicon or composites of these materials.

In one embodiment, the hollow particles are produced by encapsulating solvents, such as hydrocarbon solvents within polymeric particles during an emulsion polymerization process in the presence of a surfactant, yielding a dispersion of charged hollow particles.

Upon removal of the excess raw material, by-products, solvents, and the like, electrostatic repulsion of the charged particles causes the particles to align themselves into an ordered, packed array. By ordered, packed array, it is meant that the particles pack together and the particles are arranged in a regular structure and may touch each other, as shown schematically in FIG. 1.

The purified dispersion of particles is applied to a substrate and dried. The dispersion of particles applied to the substrate may contain 10-70 vol. % of charged particles or 30-65 vol. % of charged particles. The dispersion can be applied to the substrate by dipping, spraying, brushing, roll-coating, curtain coating, flow-coating, or die-coating to a desired thickness. The wet coating may have a thickness of 4-50 microns, such as 40 microns. Upon drying, the material contains the particles that have self-aligned in a Bragg array and diffract radiation accordingly.

In one embodiment, the dispersion of particles further includes monomers or other polymer precursors of the matrix material that are soluble in the dispersion (water or other solvent). Such monomers or polymer precursors may be present in an amount that aids in binding the array together prior to coating the array with a curable matrix composition, as described below.

The substrate onto which the particles are received may be a flexible material, such as paper or a film (or sheet) of polyester or polyethylene terephthalate (PET), or an inflexible material, such as glass or plastic. By "flexible" it is meant that the substrate can undergo mechanical stresses, such as bending, stretching, compression, and the like, without significant irreversible change. One suitable substrate is a microporous sheet. Some examples of microporous sheets are disclosed in U.S. Pat. Nos. 4,833,172; 4,861,644 and 6,114,023, which are incorporated herein by reference. Commercially available microporous sheets are sold under the designation Teslin® by PPG Industries, Inc. Other suitable flexible substrates include natural leather, synthetic leather, finished natural leather, finished synthetic leather, suede, vinyl nylon, ethylene vinyl acetate foam (EVA foam), thermoplastic urethane (TPU), fluid-filled bladders, polyolefins and polyolefin blends, polyvinyl acetate and copolymers, polyvinyl chloride and copolymers, urethane elastomers, synthetic textiles, and natural textiles.

In certain embodiments, the flexible substrates are compressible substrates. "Compressible substrate" and like terms refer to substrates capable of undergoing a compressive deformation and returning to substantially the same shape once the compressive deformation has ceased. The term "compressive deformation" means a mechanical stress that reduces the volume at least temporarily of a substrate in at least one direction.

Matrix

The dried array of particles (unitary, core-shell, or hollow) on a substrate may be fixed in a polymeric matrix by coating the array of particles with a fluid curable matrix composition that includes monomers and/or other polymer precursors referred to collectively herein as polymer precursor material, followed by curing of the matrix composition. Suitable materials for the matrix include acrylic polymers, polystyrene, polyurethane, alkyd polymers, polyester, siloxane-containing polymers, polysulfides, epoxy-containing polymers, and polymers derived from epoxy-containing polymers. As disclosed in U.S. Pat. No. 6,894,086 the particles that have self-aligned in the dried array are interpenetrated with the fluid curable matrix composition, such as an ultraviolet (UV) curable composition. The curable matrix composition material may be coated onto the dried array of particles via a variety of techniques, non-limiting examples thereof including dipping, spraying, brushing, roll coating, curtain coating, flow coating, slot-die coating, and printing processes, such as intaglio printing (e.g., gravure printing), ink-jet printing, and flexographic printing. By coating, it is meant that the curable matrix composition covers the entirety of the array and fills the interstitial spaces between the particles, with the particles remaining packed adjacent to each other. Other techniques for receiving the array of particles in a curable matrix composition may be used, such as producing a layer of the curable matrix composition and embedding an array of particles in the curable matrix layer. The matrix composition is cured (such as by exposure to UV radiation) to fix the array of packed particles within the matrix. Other curing mechanisms may be used to fix the array of particles in the matrix.

Upon interpenetration of the array with the fluid curable matrix composition, some of the polymer precursor material of the curable matrix composition may diffuse into the particles, thereby, increasing the particle diameters. For core-shell particles, the shell or the core or both may be swollen by the curable matrix composition. Solvent may also diffuse into the particles and create swelling. The solvent is ultimately removed from the array, but this swelling from solvent may impact the final dimensions of the particles. The degree of swelling of the particles may be controlled by controlling the length of time allowed for interpenetration of polymer precursor materials into the particles and/or by heating the material to enhance the diffusion rate at which the swelling components diffuse into the particles. Upon curing of the curable matrix material, the relative positions of the particle centers may be fixed, such that the inter-particle spacing is fixed.

The radiation diffraction component of the present invention is non-gelatinous and substantially solid. By non-gelatinous, it is meant that the radiation diffraction component does not contain a fluidizing material, such as water, and is not a hydrogel, nor produced from a hydrogel. In certain embodiments, the radiation diffraction component of the present invention substantially only includes the particles and the polymeric matrix with some possible residual solvent and, thus, is substantially solid. The volumetric ratio of the particles to the polymer matrix in the radiation diffracting materials is typically about 25:75 to about 80:20.

The radiation diffraction component may diffract radiation at a single wavelength or a plurality of wavelengths, such as to exhibit an image. A radiation diffraction component that diffracts at a single wavelength may generally exhibit a single goniochromatic effect, such as appearing one color when viewed normal to the component and another color when viewed at a glancing angle to the component. A radiation diffraction component that diffracts at a plurality of wavelengths may appear multi-colored at both viewing angles. To produce a radiation diffraction component that diffracts radiation at a plurality of wavelengths, a portion of the radiation diffraction component may be treated to alter (generally, increase) the diffraction wavelength in that portion. A shift in the diffraction wavelength can be achieved by changing the effective refractive index of the radiation diffractive material (the effective refractive index of the radiation diffractive material being proportional to diffraction wavelength) or by changing the particle size (the diameters of the particles, thus the distances between planes of the particles being proportional to diffraction wavelength).

The effective refractive index of the radiation diffractive material can be varied by using different compositions of matrix within the component. For example, using a single particle type and applying different matrix materials to discreet locations results in differing effective refractive indices at those locations with resulting differing diffraction wavelengths.

A plurality of diffraction wavelengths may be produced by using a plurality of radiation diffracting materials. For example, a radiation diffraction component exhibiting two colors of diffracted visible light at a particular viewing angle may be produced by applying a first radiation diffractive material having a first array of particles yielding a first color appearance (e.g., red) and applying a second radiation diffractive material having a second array of particles with a smaller particle size yielding a second appearance (e.g., green).

Alternatively, the radiation diffracting component may exhibit a plurality of diffraction wavelengths by using a single array of particles and altering the array of particles in discreet portions of the component.

Alteration of the array of particles may be achieved by increasing the dimensions of the particles so that the centers of the particles are further spaced apart from each other or by expanding the matrix composition to urge the particles away from each other. In either case, the distances between the centers of the particles, referred to herein as the inter-particle spacing, is altered, which alters the distances between Bragg planes within the array. The particle dimensions may be increased by diffusing materials into the particles, such that the particles expand, thereby increasing the inter-particle spacing. Core-shell, unitary, or hollow particles may be expanded. The diffusion rate may be enhanced with heating. For a curable matrix composition containing polymer precursor material, the polymer precursor materials may diffuse into the particles. Alternatively, a diffusible composition (such as a solvent) may be applied to the radiation diffraction component for diffusing into and expanding the particles. In another embodiment, the matrix may be expanded by addition of monomers or a solvent (water or organic solvents) to swell the matrix composition (with or without expansion of the particles) and increase the inter-particle spacing. Alteration of the inter-particle spacing by diffusion of material into the particles and/or expansion of the matrix may also affect the refractive index contrast between the particles and the matrix, the refractive index contrast between alternating layers in the array, and/or the effective refractive index of the radiation diffracting component.

Following alteration of the inter-particle spacing, refractive index contrast, and/or effective refractive index, the matrix composition is cured. Curing of the matrix composition fixes the relative positions of the particles in the radiation diffraction component.

The inter-particle spacing may be altered in more than one portion of the radiation diffraction component according to another embodiment of the invention. An array of particles is received within a curable matrix and a first portion of the radiation diffraction component is exposed to actinic radiation to at least partly cure the matrix composition in the first portion. The inter-particle spacing is altered in another (uncured) portion to create a second portion in the radiation diffraction component that diffracts radiation differently from the first portion of the radiation diffracting material. This process of exposing a portion of component with uncured matrix composition to actinic radiation and altering the inter-particle spacing in another portion may be repeated several times before a final step of curing any remaining uncured portion of the matrix composition. With each subsequent alteration of the inter-particle spacing, the altered portion, when cured, diffracts radiation at a different wavelength from the other portions of the radiation diffracting component. In this manner, the radiation diffracting component can exhibit a plurality of diffraction wavelengths, which may appear as a multi-colored image therein.

For example, a first portion of the radiation diffraction component may be exposed to actinic radiation by use of a mask or by focused laser radiation. In one embodiment, when the matrix composition is curable with ultraviolet (UV) radiation, such as an acrylate-based composition, the actinic radiation used to cure the matrix composition includes UV radiation. The mask may include openings in a desired configuration of an image and may be laid over the radiation diffraction component having an array of particles provided in a curable matrix composition. The radiation diffraction component is exposed to actinic radiation through the openings in the mask to at least partially cure the exposed portions. The inter-particle spacing between the particles in the remaining portions is altered, and the radiation diffraction component is exposed to actinic radiation to fully cure all portions. The openings in the mask may correspond to the image, such that the first cured portion exhibits the image. Alternatively, the openings may correspond to a negative of the image, such that the first cured portion of the imaged radiation diffraction component constitutes the background of the image. In either case, the imaged radiation diffraction component exhibits an image due to differences in the diffraction wavelength between the first cured portion and the other cured portion. By different wavelengths, it is meant that there is a discernable difference in the wavelength or band of wavelengths diffracted by the two portions of the imaged member. The difference in diffraction wavelength may be visible to the human eye or may be detectable by an optical device, such as a spectrophotometer or the like.

In a related embodiment, a highly detailed image may be produced in the radiation diffraction component by using a transparency bearing a grey-scale negative image. The grey-scale negative image may be produced by converting a full-color image to a grey-scale negative image, which is then reproduced onto a transparency that functions as a mask. Actinic radiation passes through the transparency where there is no image negative, thereby, curing a first portion of the matrix composition in the configuration of the image. The areas of the uncured portion of the matrix composition may constitute the background of the image. The inter-particle spacing in the uncured portion is altered so that the inter-particle spacing in the uncured portion is different from the inter-particle spacing of the first cured portion, and then the other portion is cured.

Alternatively, one or more lasers may provide actinic radiation to produce an image in a radiation diffracting component. Movement of the laser across the radiation diffraction component creates a path of cured matrix composition corresponding to an image portion following the pattern of movement of the laser. A plurality of lower-intensity lasers may be focused at a common location to provide sufficient actinic radiation at location for curing of the matrix composition. The plurality of lasers may be moved across the array of the curable matrix in a similar manner as a single laser.

In another embodiment, an image is produced by printing an imaging composition onto a portion of an ordered periodic array of particles and fixing the printed array in a matrix material, resulting in a radiation diffracting component for use in the present invention. Any suitable printing technique may be used, such as xerographic printing, ink jet printing, flexographic printing, silk screening, gravure printing, or intaglio printing. The printed portion may correspond to an image with the remaining portion that was not printed serving as a background. Alternatively, the printed portion may be a background to an image produced in the remaining portion. The imaging composition shifts the diffraction wavelength and/or changes the refractive index of the printed portion of the array, such that the difference in optical properties between the printed portion and a remainder of the component is detectable as an image. The image is detectable by exposing the imaged component to radiation and detecting radiation reflected from the imaged component as an image.

The imaging composition may be a curable matrix composition comprising polymer precursor material as described above. The imaging composition is printed onto the ordered periodic array of particles in the configuration of an image. The imaging composition fills the interstitial gaps between the particles in the array in the location of printing (the printed portion), which may urge the particles in the printed portion apart from each other and change the inter-particle spacing, thereby, shifting the Bragg conditions and the resulting diffraction wavelength. The imaging composition also may diffuse into the particles, swelling the particles and further increase the inter-particle spacing. The imaging composition also shifts the refractive index difference between the alternating planes in the printed portion, thereby changing the refractive index contrast and intensity of reflected radiation in the printed portion.

Diffusion of the imaging composition into the particles may be enhanced by heating the array to increase the rate of diffusion of materials from the imaging composition into the particles. The imaging composition may also include a solvent to enhance the rate and/or concentration of polymerizable components diffusing into the particles.

The printed array having an image printed thereon may be coated with a curable clearcoat composition similar to the composition disclosed in U.S. Pat. No. 6,894,086 (incorporated herein by reference) to interpenetrate the array of particles with the curable clearcoat composition, which is then cured. By coating, it is meant that the curable matrix composition covers at least substantially the entirety of the array and at least, in part, fills the interstitial spaces between the particles. The curable clearcoat composition may be applied by spraying, brushing, roll-coating, gravure coating, curtain coating, flow-coating, slot-die coating, xerographic printing, ink jet printing, flexographic printing, silk screening, gravure printing, intaglio printing, or the like. The coated array is subjected to curing, such as by UV radiation, to polymerize the monomers of the imaging composition as well as the clearcoat composition. Alternatively, curing of the imaging composition and clearcoat composition may be conducted in separate steps. The resulting imaged radiation diffraction component includes a printed portion that received the imaging composition and a background portion that did not receive the imaging composition. The printed portion of the imaged radiation diffraction component diffracts radiation at a different wavelength from the background portion and at a different intensity of reflection than the background portion.

Alternatively, an ordered periodic array of particles may be printed with an imaging composition to alter the inter-particle spacing and/or refractive index of the printed portion as described above and is cured prior to applying any subsequent coatings in order to fix the printed portion of the array. The cured printed array is then overcoated with a coalescing composition that coalesces the particles in the background portion, rendering the background portion substantially unable to diffract radiation, and may appear substantially colorless. Suitable coalescing compositions include organic solvents or low molecular weight monomers. By substantially colorless, it is meant that the background portion does not exhibit color that is discernable to the naked eye, but may appear transparent, semi-transparent, or opaque depending upon the degree of coalescence. The printed array with coalesced background portion may be used as an imaged member as is or it may be overcoated with a clearcoat coating composition as described above. The imaged radiation diffraction component may be used in place on the substrate or may be removed therefrom as a self-supporting film for use on another support.

Instead of coalescing the background portion, the cured printed array may be treated so as to disturb and/or remove the particles in the background portion to prevent the background portion from diffracting radiation. An ordered periodic array of particles may be disturbed by various techniques including, for example, by applying a solvent to the array that at least partially dissolves the particles or by mechanically disrupting the particles. The disturbed particles may be removed from the cured printed array, such that only the imaged portion of the array remains intact. The cured printed array with removed (or disturbed) background portion may be used as an imaged member as is or it may be overcoated with a clearcoat coating composition as described above. The imaged radiation diffraction component may be used in place on the substrate or may be removed therefrom as a self-supporting film for use on another support.

In another embodiment of the present invention, the radiation diffraction component includes an inverse opal structure that defines an ordered array of voids. An inverse opal structure can be produced according to conventional techniques. For example, a periodic array of particles may be produced and back filled with a curable matrix composition, which is then fixed in place around the ordered array of particles. By fixing, it is meant that the matrix material is cured, or cross-linked, or otherwise fixed surrounding the particles, creating a crystalline ordered array. The particles may be removed from the array by dissolving the particles in a solvent or by heating the material to degrade and volatilize the particles. For example, polystyrene particles or other polymer particles may be dissolved in a solvent, such as toluene, followed by heating to evaporate the toluene, thereby, resulting in an inverse opal structure. The resulting inverse opal structure includes the fixed matrix material with a periodic array of voids therein. The present invention is not limited to the technique for producing such an inverse opal structure, nor the materials of the particles which are removed in order to produce the inverse opal structure.

In general, a radiation diffracting component, as used in the present invention (schematically shown in FIG. 1), exhibits specular reflection from the major opposing surfaces thereof. Even though the radiation diffracting component 2 diffracts radiation whereby a diffraction wavelength is reflected therefrom, the major surfaces have a mirror-like appearance, which masks the diffraction wavelength. The image in the radiation diffracting material may be visible as specular reflection, but for the purposes of the present invention, such minimal visibility of an image is considered to be essentially invisible. Thus, as used herein, "invisible" means the image is nor colored or clearly visible to the human eye, even when some portion thereof may be detected via specular reflection.

However, when the radiation diffracting component 2 is placed over a dark surface, i.e., a radiation absorbing surface, substantially all wavelengths of visible radiation are absorbed, except the diffraction wavelength. As a result, the reflected light at the diffraction wavelength is visible as colored reflection. The visible reflection may appear as a solid color (no image) or as a multi-colored image. In either case, the radiation diffracting component 2 also exhibits goniochromicity, wherein the diffraction wavelength shifts with viewing angle.

The present invention incorporates this feature of enhancing the contrast of a radiation diffracting component in order to detect the diffracted radiation reflected, thereby, by utilizing an absorbing layer thereunder. Alternatively, diffraction may be blocked or cancelled by including an absorbing layer therewith. In one aspect of the present invention, absorbance of radiation that interacts with the wavelengths diffracted by the radiation diffracting component is provided by a photochromic component. The photochromic component exhibits a reversible color change (e.g., colorless to dark) which, in turn, causes the radiation diffracting component to reversibly appear colored. In this manner, the radiation diffracting component and/or images therein can appear to turn on or off, i.e., appear or disappear.

Photochromic Component

The composite material of the present invention includes a photochromic component to provide a light influencing property. The photochromic component includes a photochromic material that may be inorganic or organic and may be present in a substrate, and/or in a coating, or film, and/or within the radiation diffracting material as described below.

A wide variety of photochromic materials may be used in the composite material of the present invention to provide a light influencing property. The photochromic materials may be provided in a variety of forms. Examples include: a single photochromic compound; a mixture of photochromic compounds; a material containing a photochromic compound, such as a monomeric or polymeric ungelled solution; a material, such as a monomer or polymer to which a photochromic compound is chemically bonded; a material comprising and/or having chemically bonded to it a photochromic compound, the outer surface of the material being encapsulated (encapsulation is a form of coating), for example, with a polymeric resin or a protective coating, such as a metal oxide that prevents contact of the photochromic material with external materials, such as oxygen, moisture, and/or chemicals that have a negative effect on the photochromic material; such materials can be formed into a particulate prior to applying the protective coating, as described in U.S. Pat. Nos. 4,166,043 and 4,367,170; a photochromic polymer, e.g., a photochromic polymer comprising photochromic compounds bonded together; or mixtures thereof.

Photochromic Material

The inorganic photochromic material may contain crystallites of silver halide, cadmium halide, and/or copper halide. Other inorganic photochromic materials may be prepared by the addition of europium (II) and/or cerium (III) to a mineral glass, such as a soda-silica glass, as known to those skilled in the art. The inorganic photochromic materials are further described in *Kirk Othmer Encyclopedia of Chemical Technology*, 4th Edition, Volume 6, pages 322-325.

The photochromic material may be an organic photochromic material having an activated absorption maxima in the range from 300 to 1000 nm. In one embodiment, the organic photochromic material comprises a mixture of (a) an organic photochromic material having a visible lambda max of from 400 to less than 550 nm, and (b) an organic photochromic material having a visible lambda max of from 550 to 700 nm.

The photochromic material may alternatively comprise an organic photochromic material that may be chosen from pyrans, oxazines, fulgides, fulgimides, diarylethenes, and mixtures thereof.

Non-limiting examples of photochromic pyrans that may be used herein include benzopyrans and naphthopyrans, e.g., naphtho[1,2-b]pyrans, naphtho[2,1-b]pyrans, indeno-fused naphthopyrans and heterocyclic-fused naphthopyrans, spiro-9-fluoreno[1,2-b]pyrans, phenanthropyrans, quinolinopyrans; fluoroanthenopyrans and spiropyrans, e.g., spiro(benzindoline)naphthopyrans, spiro(indoline)benzopyrans, spiro(indoline)naphthopyrans, spiro(indoline)quinolinopyrans and spiro(indoline)pyrans and mixtures thereof. Non-limiting examples of such pyrans are disclosed in U.S. Pat. No. 5,645,767 at column 2, line 16 to column 12, line 57; U.S. Pat. No. 5,723,072 at column 2, line 27 to column 15, line 55; U.S. Pat. No. 5,698,141 at column 2, line 11 to column 19, line 45; U.S. Pat. No. 6,022,497 at column 2, line 21 to column 11, line 46; U.S. Pat. No. 6,080,338 at column 2, line 21 to column 14, line 43; U.S. Pat. No. 6,136,968 at column 2, line 43 to column 20, line 67; U.S. Pat. No. 6,153,126 at column 2, line 26 to column 8, line 60; U.S. Pat. No. 6,296,785 at column 2, line 47 to column 31, line 5; U.S. Pat. No. 6,348,604 at column 3, line 26 to column 17, line 15; U.S. Pat. No. 6,353,102 at column 1, line 62 to column 11, line 64; U.S. Pat. No. 6,630,597 at column 2, line 16 to column 16, line 23; U.S. Pat. No. 6,736,998 at column 2, line 53 to column 19, line 7; U.S. Pat. No. 7,094,368 at column 2, line 39 to column 10, line 22; U.S. Pat. No. 7,116,357 at column 4, line 13 to column 37, line 34; U.S. Pat. No. 7,481,955 at column 2, line 42 to column 25, line 51; U.S. Pat. No. 7,527,754 at column 2, line 65 to column 16, line 10; U.S. Pat. No. 7,556,750 at column 2, line 55 to column 29, line 55; U.S. Pat. No. 7,556,751 at column 3, line 43 to column 24, line 38; and U.S. Pat. No. 7,907,346 at column 9, line 59 to column 30, line 61; the cited portions of which are incorporated herein by reference.

Further non-limiting examples of naphthopyrans and complementary organic photochromic substances are described in U.S. Pat. No. 5,658,501 at column 1, line 64 to column 13, line 17, which disclosure is incorporated herein by reference. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Examples of photochromic oxazines that may be used include benzoxazines, naphthoxazines, and spiro-oxazines, e.g., spiro(indoline)naphthoxazines, spiro(indoline)pyridobenzoxazines, spiro(benzindoline)pyridobenzoxazines, spiro(benzindoline)naphthoxazines, spiro(indoline)benzoxazines, spiro(indoline)fluoranthenoxazine, spiro(indoline)quinoxazine and mixtures thereof.

Examples of photochromic fulgides or fulgimides that may be used include: fulgides and fulgimides, which are disclosed in U.S. Pat. No. 4,685,783 at column 1, line 57 to column 5, line 27, and in U.S. Pat. No. 4,931,220 at column 1, line 39 through column 22, line 41, the disclosure of such fulgides and fulgimides are incorporated herein by reference. Non-limiting examples of diarylethenes are disclosed in U.S. Patent Application No. 2003/0174560 paragraphs [0025] to [0086].

Polymerizable organic photochromic materials, such as polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymeric matrix compatibilized naphthopyran of U.S. Pat. No. 6,555,028 at column 2, line 40 to column 24, line 56 may be used. The disclosures of the aforementioned patents on polymerizable organic photochromic materials are incorporated herein by reference.

Typically, the photochromic component is present in the composite material in a photochromic amount; that is, in an amount yielding a color change distinguishable by electronic methods of detection or the naked eye upon exposure to radiation. The amount of photochromic material incorporated into the composite material may vary widely.

Photochromic Composition

In one embodiment, the photochromic material is provided in a curable film-forming photochromic composition, with the amount of photochromic material which may range from 0.01 to 40 weight percent based on the weight of the solids in the curable film-forming composition. The amount of photochromic material may range from 0.1 to 30 weight percent, from 0.3 to 20 weight percent, or from 1 to 10 weight percent. The amount of photochromic material in the composite material may range between any combinations of these values, inclusive of the recited range.

A photochromic composition may be provided in at least a partial film or coating. The thickness of the films of polymeric organic materials may vary widely. The thickness may range, for example, from 0.1 mil to 40 mils and any range of thicknesses between these values, inclusive of the recited values. However, if desired, greater or lesser thicknesses may be used.

The polymeric organic materials may be chosen from thermosetting materials, thermoplastic materials, and mixtures thereof. Examples of films of polymeric organic materials are disclosed in U.S. Pat. No. 7,465,414 at column 14, line 7 to column 20, line 61, which disclosure of such polymeric films is incorporated herein by reference.

In certain embodiments, the film comprises thermoplastic polymeric organic materials, such as nylon, poly(vinyl acetate), vinyl chloride-vinyl acetate copolymer, poly ($C_1$-$C_8$ alkyl) acrylates, poly ($C_1$-$C_8$ alkyl) methacrylates, styrene-butadiene copolymer resin, poly(urea-urethanes), polyurethanes, polyterephthalates, polycarbonates, polycarbonate-silicone copolymer, and mixtures thereof.

In one embodiment, the photochromic composition comprises a coating composition according to various non-limiting embodiments as disclosed herein. Such coating compositions are known and may be made with components and according to methods well understood and appreciated by those skilled in the art. For example, polyurethane coatings compositions that may be used to prepare the photochromic coatings according to the present invention may be produced by the catalyzed or uncatalyzed reaction of an organic polyol component and an isocyanate component in the presence of photochromic material(s). Materials and methods for the preparation of polyurethanes are described in *Ullmann's Encyclopedia of Industrial Chemistry*, Fifth Edition, 1992, Vol. A21, pages 665 to 716. Non-limiting examples of methods and materials, e.g., organic polyols, isocyanates, and other components, which can be used to prepare the polyurethane coating are disclosed in U.S. Pat. No. 4,889,413, at col. 2, line 42 to col. 12, line 21; and U.S. Pat. No. 6,187,444, at col. 2, line 52 to col. 12, line 15. Other isocyanate containing coating compositions, such as mono-isocyanate coating compositions, which are disclosed in U.S. Pat. No. 6,916,537 ("the '537 patent") at col. 3, lines 1 to 12, comprise (in addition to a photochromic material) a reaction product (non-limiting examples of which are set forth in the '537 patent at col. 7, lines 4-37) of a polyol comprising at least one carbonate group (non-limiting examples of which are set forth in the '537 patent at col. 7, line 38 to col. 8, line 49) and an isocyanate comprising at least one reactive isocyanate group and at least one polymerizable double bond (non-limiting examples of which are set forth in the '537 patent at col. 8, line 50 to col. 9, line 44), and which optionally comprises an addition copolymerizable monomer (non-limiting examples of which are set forth in the '537 patent at col. 11, line 47 to col. 20, line 43). The above-referenced disclosures are hereby specifically incorporated by reference.

Other contemplated isocyanate containing coating compositions include a curable film-forming composition comprising: i) a resinous material comprising a monomer, oligomer, and/or polymer containing reactive functional groups; ii) a curing agent having two or more reactive functional groups that are reactive with functional groups in the resinous material of i); and iii) a material different from i) and ii), comprising a blocked isocyanate group blocked with a blocking agent capable of deblocking at a low temperature as described in U.S. Pat. No. 7,666,510 at column 5, line 20 to column 22, line 29, which disclosure is incorporated herein by reference.

Non-limiting examples of aminoplast resin coating compositions that may be used to produce photochromic coatings according to the present invention may be prepared by combining a photochromic material with the reaction product of a functional component(s) having at least two functional groups chosen from hydroxyl, carbamate, urea, or a mixture of any thereof and an aminoplast resin, e.g., crosslinking agent as described in U.S. Pat. No. 4,756,973, at col. 4, line 59 to col. 7, line 3; U.S. Pat. No. 6,506,488, at col. 2, line 43 to col. 12, line 23; and U.S. Pat. No. 6,432,544, at col. 2, line 32 to col. 14, line 5. The above-referenced disclosures are hereby specifically incorporated by reference.

Non-limiting examples of polysilane coating compositions contemplated for use in preparing photochromic coatings may be prepared by hydrolyzing at least one silane monomer, such as glycidoxypropyltrimethoxysilane, vinyltrimethoxysilane, methacryloxypropyltrimethoxysilane, tetramethoxysilane, tetraethoxysilane, and/or methyltrimethoxysilane, and combining the hydrolyzate with at least one photochromic material as described in U.S. Pat. No. 4,556,605, at col. 4, line 6 to col. 17, line 40, which disclosure is hereby specifically incorporated by reference.

Non-limiting examples of poly(meth)acrylate coating compositions contemplated for use in preparing the photochromic coatings of the present invention may be prepared by combining photochromic materials(s) with mono-, di-, or multi-functional (meth)acrylates as described in U.S. Pat. No. 6,025,026, at col. 6, line 5 to col. 11, line 28; U.S. Pat. No. 6,150,430, at col. 2, line 51 to col. 8, line 58; and U.S. Pat. No. 6,602,603, at col. 2, line 60 to col. 7, line 50. Also contemplated is the use of dendritic polymeric acrylate described in U.S. Pat. No. 7,666,331 at column 5, line 43 to column 25, line 55. The above-referenced disclosures are hereby specifically incorporated by reference.

Non-limiting examples of polyanhydride coating compositions that may be used to prepare the photochromic coatings according to the present invention may be prepared by the reaction of a hydroxyl-functional component and a polymeric anhydride-functional component in a composition including at least one organic photochromic material as described in U.S. Pat. No. 6,432,544, at col. 2, line 32 to col. 14, line 5. Non-limiting examples of hydroxyl-functional components, anhydride-functional component(s), and other components that can be used to prepare the polyanhydride photochromic coatings are disclosed in U.S. Pat. No. 4,798,745, at col. 2, line 67 to col. 8, line 65; U.S. Pat. No. 4,798,746, at col. 2, line 32 to col. 11, line, 45; and U.S. Pat. No. 5,239,012, at col. 3, line 17 to col. 6, line 52. Other suitable polyanhydride coating compositions are described in U.S. Pat. No. 6,436,525, at col. 2, line 15 to col. 11, line 60. The above-referenced disclosures are hereby specifically incorporated by reference.

Non-limiting examples of poly(meth)acrylamide coating compositions contemplated for use in preparing the photochromic coatings may be prepared by combining a photochromic material with the free radical initiated reaction product of a polymerizable ethylenically unsaturated composition comprising N-alkoxymethyl(meth)acrylamide and at least one other copolymerizable ethylenically unsaturated monomer, such as described in U.S. Pat. No. 6,060,001, at col. 2, line 6 to col. 5, line 39. Methods for preparing N-alkoxymethyl(meth)acrylamide functional polymers are described in U.S. Pat. No. 5,618,586, at col. 1, line 65 to col. 7, line 2. The above-referenced disclosures are hereby specifically incorporated by reference.

Non-limiting examples of epoxy resin coating compositions that can be used to prepare the photochromic coatings of the present invention, can be prepared by combining photochromic compound(s), epoxy resins or polyepoxides and curing agents as described in U.S. Pat. No. 4,756,973, at col. 3, line 50 and col. 7, line 3; and U.S. Pat. No. 6,268,055, at col. 2, line 63 to col. 17, line 3. The above-referenced disclosures are hereby specifically incorporated by reference.

Other non-limiting examples of coating compositions that may be used to form photochromic coatings disclosed herein can include the poly(urea-urethane) compositions disclosed in U.S. Pat. No. 6,531,076, at col. 3, line 4 to col. 10, line 49, which disclosure is hereby specifically incorporated by reference.

The coating compositions of the present invention may further comprise one or more additives that may aid in the processing and/or performance of the composition or a coating or article derived therefrom. Non-limiting examples of such additives can include, for example, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and combinations and mixtures of any thereof.

Additional Coatings

Non-limiting examples of additional coatings and films that may be used in conjunction with the photochromic components disclosed herein include primer or compatiblizing coatings, protective coatings, including transitional coatings, abrasion-resistant coatings, and other coatings that protect against the effects of polymerization reaction chemicals and/or protect against deterioration due to environmental conditions, such as moisture, heat, ultraviolet light, oxygen (e.g., UV-shielding coatings and oxygen barrier-coatings), anti-reflective coatings, protective films, and combinations thereof.

Non-limiting examples of primer or compatiblizing coatings that may be used in conjunction with various non-limiting embodiments disclosed herein include coatings comprising coupling agents, at least partial hydrolysates of coupling agents, and mixtures thereof. As used herein "coupling agent" means a material having a group capable of reacting, binding and/or associating with a group on a surface. Coupling agents according to various non-limiting embodiments disclosed herein may include organometallics such as silanes, titanates, zirconates, aluminates, zirconium aluminates, hydrolysates thereof and mixtures thereof. As used herein, the phrase "at least partial hydrolysates of coupling agents" means that some to all of the hydrolyzable groups on the coupling agent are hydrolyzed. Other non-limiting examples of primer coatings that are suitable for use in conjunction with the various non-limiting embodiments disclosed herein include those primer coatings described U.S. Pat. No. 6,025,026 at col. 3, line 3 to col. 11, line 40 and U.S. Pat. No. 6,150,430 at col. 2, line 39 to col. 7, line 58, which disclosures are hereby specifically incorporated herein by reference.

As used herein, the term "transitional coating" means a coating that aids in creating a gradient in properties between two coatings. For example, although not limiting herein, a transitional coating may aid in creating a gradient in hardness between a relatively hard coating (such as an abrasion-resistant coating) and a relatively soft coating (such as a photochromic coating). Non-limiting examples of transitional coatings include radiation-cured, acrylate-based thin films as described in U.S. Pat. No. 7,452,611 at column 5, line 21 through column 28, line 31, which are hereby specifically incorporated by reference herein.

As used herein, the term "abrasion-resistant coating" refers to a protective polymeric material that demonstrates a resistance to abrasion that is greater than a standard reference material, e.g., a polymer made of CR-39® monomer available from PPG Industries, Inc, as tested in a method comparable to ASTM F-735 Standard Test Method for Abrasion Resistance of Transparent Plastics and Coatings Using the Oscillating Sand Method. Non-limiting examples of abrasion-resistant coatings include abrasion-resistant coatings comprising organosilanes, organosiloxanes, abrasion-resistant coatings based on inorganic materials, such as silica, titania, and/or zirconia, and organic abrasion-resistant coatings of the type that are ultraviolet light curable.

Non-limiting examples of polymeric materials that can be used as a protective film include nylon, poly(vinyl acetate), vinyl chloride-vinyl acetate copolymers, poly(alkyl acrylates and methacrylates), thermoplastic polycarbonate, annealed or stretched polycarbonate, styrene-butadiene copolymer resin, e.g., K-resin, thermoplastic polyurethanes, and polyurea urethanes.

Non-limiting examples of antireflective coatings include a monolayer, multilayer coatings of metal oxides, metal fluorides, or other such materials, which may be deposited onto the articles disclosed herein (or onto self-supporting films that are applied to the articles), for example, through vacuum deposition, sputtering, etc.

The composite material of the present invention may further comprise an, at least, partial film or coating superposed thereon. Such a polymeric organic material, i.e., a coating and/or film, may comprise photochromic material. The types of material used for the film or coating may vary widely and be chosen from the polymeric organic materials of the substrate and the films and coatings described hereinafter. The thickness of the films of polymeric organic materials may vary widely. The thickness may range, for example, from 0.1 mil to 40 mils and any range of thicknesses between these values, inclusive of the recited values. However, if desired, greater or lesser thicknesses may be used.

The polymeric organic materials may be chosen from thermosetting materials, thermoplastic materials, and mixtures thereof. Examples of films of polymeric organic materials are disclosed in U.S. Pat. No. 7,465,414 at column 14, line 7 to column 20, line 61, which disclosure of such polymeric films is incorporated herein by reference.

Substrate

In one embodiment of the invention, the photochromic coating composition is provided on a substrate that includes a microporous material. A suitable microporous material comprises polyolefin, finely-divided substantially water-insoluble particulate filler, and a network of interconnecting pores communicating throughout the microporous material. The microporous material can comprise a substrate having at least one surface comprising the aforementioned polyolefin, particulate filler, and network of interconnecting pores. The polyolefin typically comprises 5 to 75 weight percent, such as 9 to 71 weight percent, or 10 to 65 weight percent, or 20 to 60 weight percent, or 25 to 50 weight percent, or 30 to 45 weight percent, based on total weight of the microporous material.

The polyolefin can comprise any of a wide variety of polyolefin materials known in the art. In one embodiment, the polyolefin comprises: (a) ultrahigh molecular weight polyolefin comprising ultrahigh molecular weight polyethylene and/or ultrahigh molecular weight polypropylene; (b) high density polyolefin comprising high density polyethylene and/or high density polypropylene; or mixtures of any of the foregoing polyolefins.

Non-limiting examples of the ultrahigh molecular weight (UHMW) polyolefin can include essentially linear UHMW polyethylene or polypropylene. Inasmuch as UHMW polyolefins are not thermoset polymers having an infinite molecular weight, they are technically classified as thermoplastic materials.

The ultrahigh molecular weight polypropylene can comprise essentially linear ultrahigh molecular weight isotactic polypropylene. Often, the degree of isotacticity of such polymers is at least 95%, e.g., at least 98%.

While there is no particular restriction on the upper limit of the intrinsic viscosity of the UHMW polyethylene, in one non-limiting example, the intrinsic viscosity can range from 18 to 39 deciliters/gram, e.g., from 18 to 32 deciliters/gram. While there is no particular restriction on the upper limit of the intrinsic viscosity of the UHMW polypropylene, in one non-limiting example, the intrinsic viscosity can range from 6 to 18 deciliters/gram, e.g., from 7 to 16 deciliters/gram.

As used herein, intrinsic viscosity is determined by extrapolating to zero concentration the reduced viscosities or the inherent viscosities of several dilute solutions of the UHMW polyolefin where the solvent is freshly distilled decahydronaphthalene, to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer in accordance with the following equation:

$$M = 5.37 \times 10^4 [\acute{\eta}]^{1.37}$$

wherein M is the nominal molecular weight and $[\acute{\eta}]$ is the intrinsic viscosity of the UHMW polyethylene expressed in deciliters/gram. Similarly, the nominal molecular weight of UHMW polypropylene is empirically related to the intrinsic viscosity of the polymer according to the following equation:

$$M = 8.88 \times 10^4 [\acute{\eta}]^{1.25}$$

wherein M is the nominal molecular weight and $[\acute{\eta}]$ is the intrinsic viscosity of the UHMW polypropylene expressed in deciliters/gram.

A mixture of substantially linear ultrahigh molecular weight polyethylene and lower molecular weight polyethylene also can be used. In a non-limiting embodiment, the UHMW polyethylene has an intrinsic viscosity of at least 10 deciliters/gram, and the lower molecular weight polyethylene has an ASTM D 1238-86 Condition E melt index of less than 50 grams/10 minutes, e.g., less than 25 grams/10 minutes, such as less than 15 grams/10 minutes, and an ASTM D 1238-86 Condition F melt index of at least 0.1 gram/10 minutes, e.g., at least 0.5 gram/10 minutes, such as at least 1.0 gram/10 minutes. The amount of UHMW polyethylene used (as weight percent) in this embodiment is described in column 1, line 52 to column 2, line 18 of U.S. Pat. No. 5,196,262 (hereinafter the '262 patent), which disclosure is incorporated herein by reference. More particularly, the weight percent of UHMW polyethylene used is described in relation to FIG. 6 of the '262 patent; namely, with reference to the polygons ABCDEF, GHCI, or JHCK of FIG. 6, which Figure is incorporated herein by reference.

The nominal molecular weight of the lower molecular weight polyethylene (LMWPE) is lower than that of the UHMW polyethylene. LMWPE is a thermoplastic material and many different types are known. One method of classification is by density, expressed in grams/cubic centimeter and rounded to the nearest thousandth, in accordance with ASTM D 1248-84 (Reapproved 1989). Non-limiting examples of the densities of LMWPE are found in the following Table 1.

TABLE 1

| Type | Abbreviation | Density, g/cm³ |
| --- | --- | --- |
| Low Density Polyethylene | LDPE | 0.910-0.925 |
| Medium Density Polyethylene | MDPE | 0.926-0.940 |
| High Density Polyethylene | HDPE | 0.941-0.965 |

Any or all of the polyethylenes listed in Table 1 may be used as the LMWPE in the matrix of the microporous material. HDPE may be used because it can be more linear than MDPE or LDPE. Processes for making the various LMWPE's are well known and well documented. They include the high pressure process, the Phillips Petroleum Company process, the Standard Oil Company (Indiana) process, and the Ziegler process. The ASTM D 1238-86 Condition E (that is, 190° C. and 2.16 kilogram load) melt index of the LMWPE is less than about 50 grams/10 minutes. Often, the Condition E melt index is less than about 25 grams/10 minutes. The Condition E melt index can be less than about 15 grams/10 minutes. The ASTM D 1238-86 Condition F (that is, 190° C. and 21.6 kilogram load) melt index of the LMWPE is at least 0.1 gram/10 minutes. In many cases the Condition F melt index is at least 0.5 gram/10 minutes, such as at least 1.0 grams/10 minutes.

The UHMWPE and the LMWPE may together constitute at least 65% by weight, e.g., at least 85% by weight, of the polymer of the microporous material. Also, the UHMWPE and LMWPE together may constitute substantially 100% by weight of the polymer of the microporous material. In a particular embodiment of the present invention, the microporous material can comprise a polyolefin comprising from 10 to 100 weight percent, such as from 10 to 90 weight percent, or from 20 to 85 weight percent, or from 35 to 65 weight percent of ultrahigh molecular weight polyolefin; and from 0 to 90 weight percent, such as from 10 to 90 weight percent, or from 20 to 85 weight percent, or from 35 to 65 weight percent of high density polyolefin, where weight percents are based on the total weight of polyolefin in the microporous material.

Other thermoplastic organic polymers also may be present in the matrix of the microporous material provided that their presence does not materially affect the properties of the microporous material substrate in an adverse manner. The amount of the other thermoplastic polymer which may be present depends upon the nature of such polymer. In general, a greater amount of other thermoplastic organic polymer may be used if the molecular structure contains little branching, few long side chains, and few bulky side groups, than when there is a large amount of branching, many long side chains, or many bulky side groups. Non-limiting examples of thermoplastic organic polymers that optionally may be present in the matrix of the microporous material include low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers can be neutralized with sodium, zinc, or the like. Generally, the microporous material comprises at least 70% by weight of UHMW polyolefin, based on the weight of the matrix. In a non-limiting embodiment, the above-described other thermoplastic organic polymers are substantially absent from the matrix of the microporous material.

As previously mentioned, the microporous material also comprises a finely-divided, substantially water-insoluble particulate filler material. The filler material typically is not colored, e.g., is a white or off-white filler material, such as a siliceous or clay particulate material.

The finely divided substantially water-insoluble filler particles can constitute from 20 to 85% by weight of the microporous material. For example such filler particles can constitute from 20 to 80% by weight of the microporous material, such as from 20% to 70% by weight of the microporous material, or from 30 to 70% by weight of the microporous material, or from 40 to 70% by weight of the microporous material and even from 45% to 65% by weight of the microporous material.

The finely divided substantially water-insoluble siliceous filler may be in the form of ultimate particles, aggregates of ultimate particles, or a combination of both. At least about 90% by weight of the siliceous filler used in preparing the microporous material substrate has gross particle sizes in the range of from 5 to about 40 micrometers, as determined by the use of a laser diffraction particle size instrument, LS230 from Beckman Coulton, capable of measuring particle diameters as small as 0.04 micron. Typically, at least 90% by weight of the filler has gross particle sizes in the range of from 10 to 30 micrometers. The sizes of the siliceous filler agglomerates may be reduced during processing of the ingredients used to prepare the microporous material. Accordingly, the distribution of gross particle sizes in the microporous material may be smaller than in the raw filler itself.

Non-limiting examples of siliceous fillers that may be used to prepare the microporous material include silica, mica, montmorillonite, kaolinite, nanoclays, such as cloisite available from Southern Clay Products, talc, diatomaceous earth, vermiculite, natural and synthetic zeolites, calcium silicate, aluminum silicate, sodium aluminum silicate, aluminum polysilicate, alumina silica gels, and glass particles. In addition to the siliceous fillers, other finely divided particulate substantially water-insoluble fillers optionally may also be employed. Non-limiting examples of such optional fillers can include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and magnesium carbonate. In one non-limiting embodiment, silica and any of the aforementioned clays can comprise the siliceous filler. Non-limiting examples of the silicas include precipitated silica, silica gel, and fumed silica.

Silica gel is generally produced commercially by acidifying an aqueous solution of a soluble metal silicate, e.g., sodium silicate at low pH with acid. The acid employed is generally a strong mineral acid, such as sulfuric acid or hydrochloric acid, although carbon dioxide can be used. Inasmuch as there is essentially no difference in density between the gel phase and the surrounding liquid phase while the viscosity is low, the gel phase does not settle out, that is to say, it does not precipitate. Consequently, silica gel may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight.

Precipitated silica generally is produced commercially by combining an aqueous solution of a soluble metal silicate, ordinarily alkali metal silicate, such as sodium silicate, and an acid so that colloidal particles of silica will grow in a weakly alkaline solution and be coagulated by the alkali metal ions of the resulting soluble alkali metal salt. Various acids may be used, including, but not limited to, mineral acids. Non-limiting examples of acids that can be used include hydrochloric acid and sulfuric acid, but carbon dioxide can also be used to produce precipitated silica. In the absence of a coagulant, silica is not precipitated from the solution at any pH. In a non-limiting embodiment, the coagulant used to effect precipitation of silica may be the soluble alkali metal salt produced during formation of the colloidal silica particles, or it may be an added electrolyte, such as a soluble inorganic or organic salt, or it may be a combination of both.

Precipitated silica can be described as precipitated aggregates of ultimate particles of colloidal amorphous silica that have not at any point existed as macroscopic gel during the preparation. The sizes of the aggregates and the degree of hydration may vary widely. Precipitated silica powders differ from silica gels that have been pulverized in generally having a more open structure, that is, a higher specific pore volume. However, the specific surface area of precipitated silica, as measured by the Brunauer, Emmet, Teller (BET) method using nitrogen as the adsorbate, is often lower than that of silica gel.

Many different precipitated silicas can be employed as the siliceous filler used to prepare the microporous material. Precipitated silicas are well-known commercial materials, and processes for producing them are described in detail in many United States Patents, including U.S. Pat. Nos. 2,940,830, 2,940,830, and 4,681,750. The average ultimate particle size (irrespective of whether or not the ultimate particles are agglomerated) of precipitated silicas used is generally less than 0.1 micrometers, e.g., less than 0.05 micrometers or less than 0.03 micrometers, as determined by transmission electron microscopy. Precipitated silicas are available in many grades and forms from PPG Industries, Inc. These silicas are sold under the Hi-Sil® tradename.

In a non-limiting embodiment, finely divided particulate substantially water-insoluble siliceous filler comprises at least 50% by weight, e.g., at least 65, 75 or 85% by weight of the substantially water-insoluble filler material. The siliceous filler can comprise from 50 to 90% by weight, e.g., from 60 to 80% by weight, of the filler material or the siliceous filler can comprise substantially all of the substantially water-insoluble filler material.

The filler, e.g., the siliceous filler, typically has a high surface area allowing the filler to carry much of the processing plasticizer used to form the microporous material. High surface area fillers are materials of very small particle size, materials that have a high degree of porosity, or materials that exhibit both characteristics. The surface area of at least the siliceous filler particles can range from 20 to 400 square meters per gram, e.g., from 25 to 350 square meters per gram, as determined by the Brunauer, Emmett, Teller (BET) method according to ASTM D1993-91. The BET surface area is determined by fitting five relative-pressure points from a nitrogen sorption isotherm measurement made using a Micromeritics TriStar 3000™ instrument. A FlowPrep-060™ station can be used to provide heat and continuous gas flow during sample preparation. Prior to nitrogen sorption, silica samples are dried by heating to 160° C. in flowing nitrogen (PS) for 1 hour. Generally, but not necessarily, the surface area of any non-siliceous filler particles used is also within one of these ranges. The filler particles are substantially water-insoluble and also can be substantially insoluble in any organic processing liquid used to prepare the microporous material. This can facilitate retention of the filler in the microporous material.

Other materials, such as lubricants, processing plasticizers, organic extraction liquids, surfactants, water, and the like, optionally may be present in the microporous material. Such materials may be present in the microporous material in relatively small amounts, for example 15% by weight, but more or less of such materials can be used as necessary. Additionally the microporous material of the present invention can include antioxidants, ultraviolet light absorbers, flame retardants, reinforcing fibers, such as chopped glass fiber strand, dyes, pigments, and the like.

On an impregnant-free basis, pores can comprise on average at least 15% by volume, e.g. from at least 20 to 95% by volume, or from at least 25 to 95% by volume, or from at least 35 to 65% by volume of the microporous material. As used herein and in the claims, the porosity (also known as void volume) of the microporous material, expressed as percent by volume, is determined according to the following equation:

$$\text{Porosity}=100[1-d_1/d_2]$$

wherein $d_1$ is the density of the sample, which is determined from the sample weight and the sample volume as ascertained from measurements of the sample dimensions, and $d_2$ is the density of the solid portion of the sample, which is determined from the sample weight and the volume of the solid portion of the sample. The volume of the solid portion of the same is determined using a Quantachrome stereopycnometer (Quantachrome Corp.) in accordance with the accompanying operating manual. Alternatively, the porosity can be calculated as described below.

The volume average diameter of the pores of the microporous material can be determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from 138 kilopascals absolute to 227 megapascals absolute). If approximately 2 percent or less of the total intruded volume occurs at the low end (from 138 to 250 kilopascals absolute) of the high pressure range, the volume average pore diameter is taken as twice the volume average pore radius determined by the porosimeter. Otherwise, an additional scan is made in the low pressure range (from 7 to 165 kilopascals absolute) and the volume average pore diameter is calculated according to the equation:

$$d=2[v_1r_1/w_1+v_2r_2/w_2]/[v_1/w_1+v_2/w_2]$$

wherein d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. The volume average diameter of the pores can be in the range of from 0.01 to 0.50 micrometers, e.g., from 0.02 to about 0.3 micrometers, such as from 0.05 to about 0.25 micrometers.

In the course of determining the volume average pore diameter of the above procedure, the maximum pore radius detected is sometimes noted. This is taken from the low pressure range scan, if run; otherwise, it is taken from the high pressure range scan. The maximum pore diameter is twice the maximum pore radius. Inasmuch as some production or treatment steps, e.g., coating processes, printing processes, impregnation processes, and/or bonding processes, can result in the filling of at least some of the pores of the microporous material, and since some of these processes irreversibly compress the microporous material, the parameters in respect of porosity, volume average diameter of the pores, and maximum pore diameter are determined for the microporous material prior to the application of one or more of such production or treatment steps.

The microporous material of the present invention typically exhibits a surface resistivity in the range of $1 \times 10^5$ to $1 \times 10^{12}$ to ohms per square, such as $1 \times 10^7$ to $1 \times 10^{10}$ ohms per square, and a static decay time at 50% relative humidity of 0.001 to 2 seconds, such as 0.002 to 1 second, thereby demonstrating superior static dissipation properties. "Surface resistivity" is a measure of the resistive and/or conductive properties of insulative materials in ohms/square as determined in accordance with *ASTM D-257, Standard Test Methods for D-C Resistance or Conductance of Insulating Materials* at 50% relative humidity. Surface resistivity values are dependent upon the relative humidity. "Static decay" is a measure of the time required in seconds for a surface exposed to both plus and minus 5 kV charge to dissipate 90% of the charge when grounded, as determined in accordance with *Federal Test Method Standard (FTM) 101C, Method 4046, Electrostatic Properties of Materials* at 50% relative humidity. For purposes of the present invention, as used herein in the specification and the claims, surface resistivity and static decay measurements are conducted at 50% relative humidity. Such properties make the microporous material of the present invention particularly suitable for articles, such as articles in the form of a sheet, including both single sheet articles or multi-layer sheet articles, useful as substrates for the microelectronics industry, for example, in the manufacture of RFID tags or smart cards.

In a multi-layer article of the present invention, the article may be in the form of a sheet wherein at least one layer comprises a microporous material, as described above. The microporous material can comprise an inner layer of the multi-layer article, although it is also suitable for use as an outer layer of the article.

Taggant

The microporous material may further contain at least one retrospectively identifiable taggant material embedded within the microporous material. The taggant material(s) can vary depending on the type of feature(s) that is desired to be embedded within the microporous material, e.g., the type of retrospective identification feature(s) that is to be used to verify the authenticity of the article, and the cost of using a particular taggant, including the cost involved in the retrospective identification process.

The taggant material(s) can provide at least one response that includes, but are not limited to, a visible response such as color, size and/or shape, and/or a response to energy stimuli, such as visible light, heat, and/or cold, and non-visible light, such as infrared light and ultraviolet light, electric current, electrical energy, and a magnetic field, and/or the taggant materials themselves can influence or alter an electrical or magnetic field. Taggant materials are commercially available from various sources. Suitable examples can include, but are not limited to, Microtaggant® brand identification particles, which are available from Microtrace, LLC of Minneapolis, Minn.; NightGlo™ phosphorescent pigments from Day Glo Color Corporation of Cleveland, Ohio; and Techmer PM 52511825 blue additive from Techmer PM of Rancho Dominguez, Calif.

The taggant materials can be chosen, for example, from a visually observant dye, fiber, and/or pigment. Also, the taggant can be, for example, a material that is chosen from fluorescent materials, phosphorescent materials, dichroic dye pigments, polarizable materials, photochromic materials, thermochromic materials, electrochromic materials, infrared and near infrared light-responsive materials, ultraviolet light-responsive materials, materials responsive to other forms of radiation, such as X-ray and gamma rays, semi-conducting nanocrystals including, but not limited to, compounds, such as cadmium selenide, magnesium selenide, calcium selenide, barium selenide, and zinc selenide, materials that are identifiable by reflection or absorption of light, materials that emit an audible or acoustic signal, materials that emit an odor, magnetic materials, conductive materials, and materials that are responsive to stimuli by a magnetic field. If the microporous material is a microporous sheet that is produced by, for example, extrusion, the taggant material chosen should be resistant to temperatures to which it may be exposed during extrusion or other processing during its preparation.

Non-limiting examples of microparticles (i.e., taggants) that can be used for purposes of retrospective identification are described, for example, in column 2, line 28 to column 6, line 47 of U.S. Pat. No. 4,053,433 and in column 1, line 46 to column 3, line 33 of U.S. Pat. No. 4,390,452, which disclosures are incorporated herein by reference. Such taggants include a sequence of visually distinguishable dyed and/or pigmented layers or other identifying indicia. The taggants can be coded with particular color sequences and/or alpha numeric codes that can be detected visually with a microscope or other magnifying devices. For example, the taggant material can contain a numeric code sequence in a multiple colored layer format. See also, U.S. Pat. No. 6,647,649 at column 3, line 40 to column 7, line 20, which disclosure is incorporated herein by reference. The size of the taggant material can vary. In a non-limiting embodiment, the size of the taggant material can vary from 1 micron to 1 millimeter, e.g., from 10 to 600 microns, such as from 20 or 50 microns to 250 microns, at their average cross section.

The taggant material can comprise combinations of chemical elements that are incorporated into microspheroids of glass beads in discrete concentration levels, e.g., in amounts of 0.5, 1.0, and 2.0% by weight. The microspheroids can range from 1 to 250 microns, e.g., from 20 to 100 microns. See the description in column 1, line 55 to column 4, line 15 of U.S. Pat. No. 3,772,200, which disclosure is incorporated herein by reference, and which uses combinations of ten chemical elements.

Taggant materials that comprise energy-sensitive materials can be embedded in the microporous material for purposes of retrospective identification. Non-limiting examples of energy sensitive materials include photochromic, dichroic polarizable, and/or thermochromic media, e.g., dyes, which have different optical properties under different conditions. For example, a thermochromic material is transparent in one temperature range, but opaque outside of that range. Photochromic materials can be transparent or one color under white light of a specified range of frequencies, e.g., from 400 to 750 nm, but a different color when exposed to light outside of that range of frequencies, e.g., to ultraviolet light. A combination of photochromic materials, each of which produce different colors in response to ultraviolet light, allow the production of colors that comprise a blend of the colors produced by different photochromic materials to be produced in response to their exposure to the energy of certain wavelengths of ultraviolet light.

In certain embodiments of the present invention, the taggant material provides at least one observable feature chosen from color, size, shape, electrical resistance, photoluminescence, a detectable odor, a feature that is identifiable audibly, and a response to energy stimuli chosen from visible light, non-visible light, heat, cold, electric current, electrical energy, and a magnetic field. The taggant material also can comprise a magnetic material that provides a unique magnetic signature, or a material that exhibits a unique NMR spectrum.

In a further embodiment of the present invention, the taggant material can provide an observable feature in response to energy stimuli chosen from fluorescent light, infra-red radiation, ultraviolet radiation, X-ray radiation, and gamma radiation. For example, the taggant material may comprise an infra-red or ultraviolet light sensitive material that is responsive to certain frequencies of near or far infra-red light or to ultraviolet light. Such materials fluoresce when exposed to the particular predetermined wavelength of the selected light source.

Additionally, the taggant can comprise a material that provides an optically variable feature, which can be provided by optically variable pigments, inks, dyes, and colorants ("optically variable media"). In this feature, the optically variable media appears to change color as the viewing angle of an observer changes (or as the angle of incident light striking the media changes. A non-limiting example of a media that provides an optically variable feature are relatively small particles, e.g., flakes comprising flat, irregularly shaped mica platelets coated with titanium dioxide and/or iron oxide. These particles can give a "pearlescent" effect, while smaller particles can produce a "satin" effect and larger particles produce a "glitter" effect. See for example page 5, paragraphs [0057] and [0058] of US Patent Publication No. 2005/0067497, which disclosure is incorporated herein by reference.

It also is contemplated that the taggant can comprise a liquid crystal that exhibits a difference in color when viewed in transmission and reflection as well as an angularly dependent colored reflection. See, for example, page 5, paragraphs [0059] and [0060] of US patent publication 2005/0067497, which disclosure is incorporated herein by reference.

Combinations of any of the aforementioned taggants may be used.

The concentration of taggant material embedded in the microporous material can vary depending on whether it is desired that the taggant be visually identifiable without special equipment or magnification; if the taggant is to be visually identifiable with special equipment and/or magnification, e.g., a covert taggant; including using forensic means. Typically, the identification means and type of taggant material used is determined by the desired end use of the microporous material and the articles formed therefrom.

The taggant material can be present within the microporous material matrix in an amount ranging from 0.001 to 80 weight percent based on weight of the microporous material, such as from 0.001 to 50 weight percent, or from 0.01 to 30 weight percent, or from 0.001 to 20 weight percent or from 0.001 to 10 weight percent.

In an alternative embodiment, the taggant material is present in the microporous material in a minor amount. That is, the taggant material can be present in amounts ranging from 0.001 to 5 weight percent, based on the weight of the microporous material. For example, the taggant material can be present in the microporous material in amounts of from 0.01 to 4 weight percent, e.g., from 0.1 to 3 weight percent, or from 1 to 2 weight percent. Also, the taggant material (depending on the size of the taggant particle) can be present within the microporous material in a concentration of from 1 to 300 particles per square inch of microporous material. Alternatively, the taggant material(s) can be present in trace amounts, for example, in a positive amount up to and including 0.001 percent by weight, based on the weight of the microporous material.

Composite Material

The composite material of the present invention includes a radiation diffraction component and a photochromic component, each as described above. The radiation diffraction component and photochromic component may be assembled together in a variety of arrangements. The radiation diffraction component 2, shown in FIG. 1, is a generic schematic applicable to all embodiments described below.

In one embodiment, as shown in FIG. 2, composite material 10 includes a multi-layered structure having a radiation diffraction component 2 positioned over a photochromic component 12. The radiation diffraction component 2 may include an image 14 that is invisible to the eye under normal, indoor lighting conditions, although it may be detected via specular reflection, as shown schematically in FIG. 3a. Upon exposure of the composite material 10 to ultraviolet radiation, the photochromic material within the photochromic component 12 reversibly transforms from a structure that exhibits a first absorption wavelength outside the visible spectrum to a second absorption wavelength within the visible spectrum. This reversible photochemical reaction results in an absorption wavelength that is visible to the human eye. The darkening of the photochromic component increases the contrast between the diffraction wavelength of the radiation diffracting component 2 and the remainder of the spectrum striking the composite material 10. In this manner, the reflected diffraction wavelength is visible to the human eye resulting in a clear presentation of the image, as shown in FIG. 3b. The embodiment shown in FIGS. 2, 3a, and 3b includes a two-color image having one color in the background and another color for the image. This is not meant to be limiting. For example, multiple images may be provided in the radiation diffracting component, each having a distinct diffraction wavelength, and in combination appearing multi-colored. Likewise, a plurality of photochromic materials may be included in the photochromic component, such that the absorption wavelengths interact with the diffraction wavelengths to provide a multi-colored effect in the composite material.

Referring to FIGS. 4, 5a, and 5b, in another embodiment, a composite material 20 includes a multi-layered structure having a photochromic component 22 overlying a radiation diffraction component 24 having an image 26 therein. In order for the image 26 to be visible to the human eye, a radiation absorbing layer 28 is provided below the radiation diffraction component 24. Absorbing layer 28 may include a support layer bearing a radiation absorbing coating containing a dye or a pigment. The support layer may be flexible, such as paper or a polymeric film (or sheet) of polyester or polyethylene terephthalate (PET), a microporous sheet or a compressible material as disclosed above or may be inflexible, such as glass or plastic. In one embodiment, the radiation absorbing layer 28 is dark colored, such as gray or black. The dark absorbing layer 28 provides contrast for viewing the image 26 under normal, indoor lighting conditions, as shown in FIG. 5a.

Upon exposure of the composite material 20 to ultraviolet radiation, the photochromic material within the photochromic component 22 reversibly transforms from a structure that exhibits a first absorption wavelength outside the visible spectrum to a second absorption wavelength. This reversible photochemical reaction results in an absorption wavelength that is visible to the human eye. When the absorption wavelength is the same or similar to the diffraction wavelength of the radiation diffracting component 24, the human eye is unable to detect the diffraction wavelength as distinguishable from the absorption wavelength from the photochromic composition and the image is no longer visible, as shown in FIG. 5b.

These embodiments are not meant to be limiting in that the components of the composite material may be selected so that the diffraction wavelength and the absorption wavelength can be tuned to enhance, mask, or partially view an image in the radiation diffraction component. In one embodiment, a UV diffracting image is provided in the radiation diffraction component that overlies the photochromic component, thus reflecting UV radiation in the region of the image. The UV reflection from the image prevents exposure and darkening of the photochromic component in the region of the photochromic component underneath the image. In this manner, the radiation diffracting component can be considered to have an "invisible" image that becomes visible upon exposure to UV radiation, when the photochromic component in the background region (i.e., the negative of the image) darkens since the UV radiation is not reflected by the radiation diffracting component in the background region.

For example, the photochromic component itself may exhibit an image upon UV radiation exposure which can contrast, match, or otherwise coordinate with the image in the radiation diffracting component. Alternatively, the photochromic component may be printed onto a support layer applied in a configuration of an image. In these embodiments, the absorption wavelength of the photochromic component and the diffraction wavelength of the radiation diffracting component may result in color construction or destruction as well as color coordination or color matching between the two components.

In the above-described embodiments of composite material 10 and 20, the particles in the radiation diffraction component of the present invention may have a unitary structure or a core-shell structure, or may be hollow.

Figure 6:
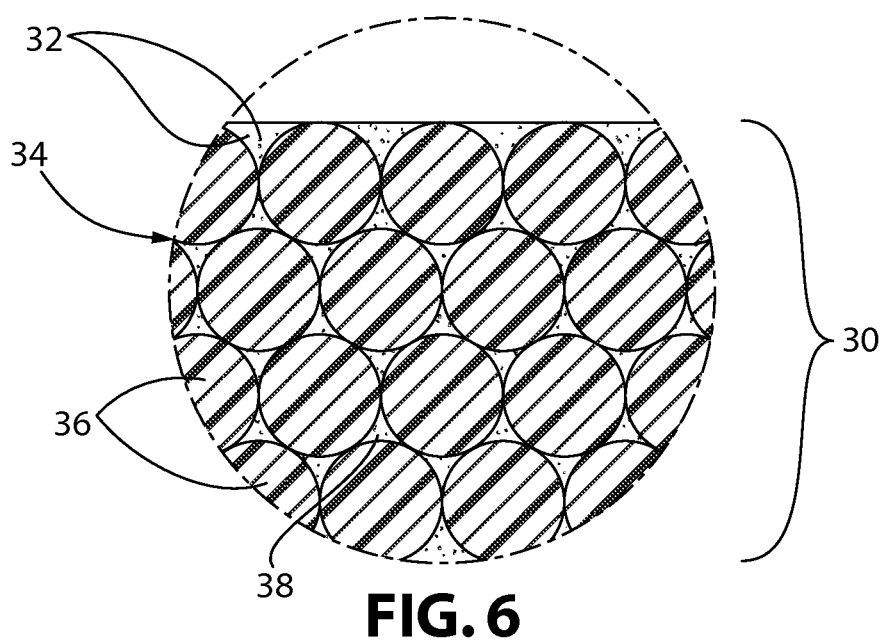
FIG. 6 is a detailed view of one embodiment of the composite material of the present invention.
Figure 7:
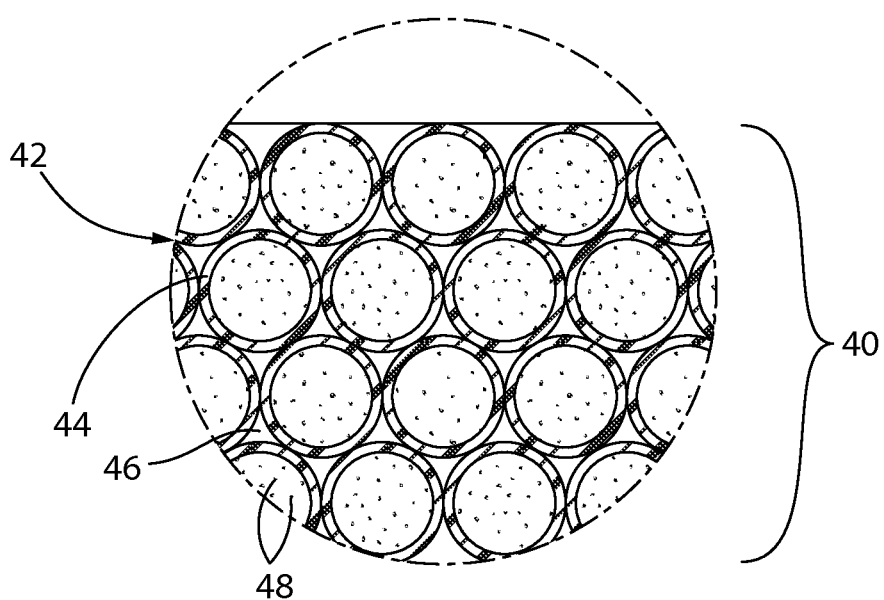
FIG. 7 is a detailed view of another embodiment of the composite material of the present invention.
Figure 8:
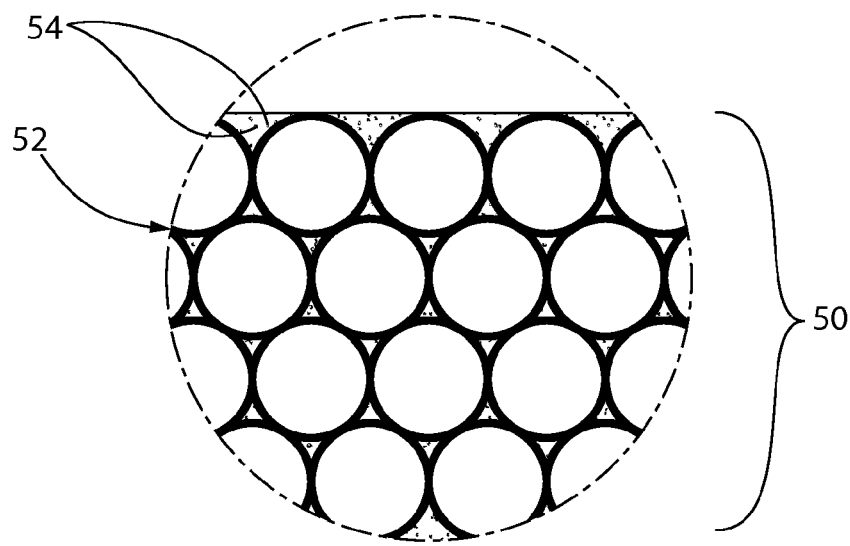
FIG. 8 is a detailed view of another embodiment of the composite material of the present invention.

For the following embodiments shown in FIGS. 6-8, the composite material includes a radiation diffracting component (as schematically illustrated in FIG. 2) containing a photochromic component therein. For these embodiments, FIGS. 6-8 depict an enlarged cross-sectional view of a radiation diffracting component to illustrate inclusion therein of the photochromic component.

Referring to FIG. 6, in another embodiment of the invention, a composite material 30 includes a photochromic component 32 that is provided within or dispersed within the radiation diffraction component 34. An ordered periodic array of particles 36 are fixed within a matrix 38 of the radiation diffraction component 34. The photochromic component 32 is contained within the matrix material in an amount sufficient to render the radiation diffraction component photochromic upon exposure to UV radiation. Alternatively, the photochromic component may be dispersed, dissolved, encapsulated, or otherwise contained within the particles.

In another embodiment, as shown in FIG. 7, composite material 40 includes a radiation diffracting component 42 having hollow particles 44 in an ordered periodic array fixed in a matrix 46. The photochromic component 48 may be dispersed within the matrix and/or received within the hollow particles.

In yet another embodiment shown in FIG. 8, composite material 50 includes radiation diffraction component 52 having an inverse opal structure with photochromic component 54 dispersed within the inverse opal structure. Alternatively, the photochromic component can also be dispersed within the voids of the inverse opal.

The composite materials shown in FIGS. 6-8 may be used in a manner similar to that of composite material 10 (FIGS. 2-3) in enhancing an image or of composite material 20 in cancelling an image (FIGS. 4-5).

Figure 9:
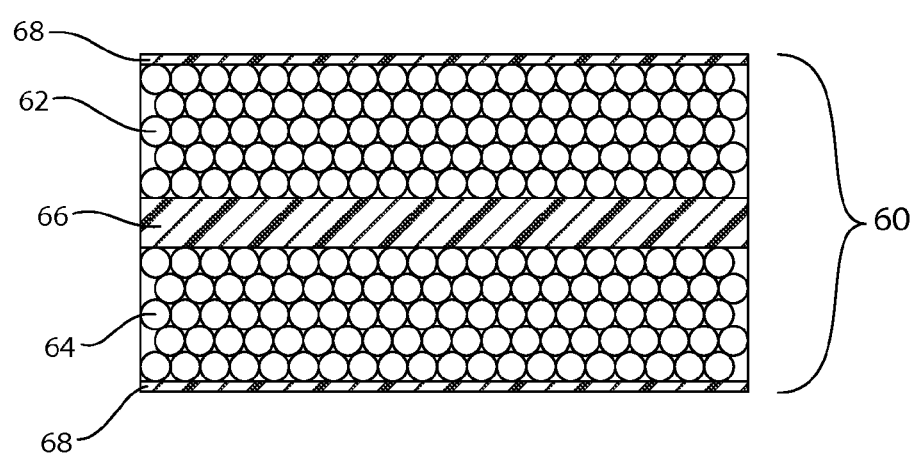
FIG. 9 is a cross-section of a multi-layered composite material of the present invention.

In another embodiment of the present invention, the composite material may have a multi-layered structure with a plurality of radiation diffracting components, as shown in FIG. 9. For example, composite material 60 includes radiation diffraction component 62 having an image reflecting a first diffraction wavelength and radiation diffraction component 64 having an image reflecting a second diffraction wavelength. The two different diffraction wavelengths may combine to exhibit a multi-colored image. A photochromic component 66 is sandwiched between radiation diffracting components 62 and 64. One or more absorbing layers 68 may be provided to enhance the contrast of one or more of the radiation diffracting components 62 and 64. Alternatively, or in addition thereto, composite material 60 may further include a photochromic component dispersed within one or more of the radiation diffraction components 62 and 64.

It should be appreciated that composite material of the present invention may include various combinations of the radiation diffracting components and photochromic components disclosed herein.

In use, the composite material of the present invention may be produced on any support, such as a polyethylene terephthalate film, such as Mylar® polyester film, not shown. The support may be provided on one exposed surface of the composite material or may be provided on both exposed surfaces of the composite material in a sandwich arrangement. The support may provide a carrier for transferring the composite material to an article. In addition, the composite material may be produced in sheet-like form with a support on opposing major surfaces thereof and may subsequently be cut into patches or threads for incorporation into or adherence to an article. In other embodiments, of the present invention, the composite material may be produced by adhering together a radiation diffracting component to a separately produced photochromic component, using adhesives or the like. Alternatively, the radiation diffracting component and/or the photochromic component may be tacky so that they adhere together when assembled into a composite material. In other embodiments, the composite material may be produced directly on an article. In addition, the uppermost surface of the composite material may be covered with a protective coating, such as the abrasion-resistant coatings and other coatings described above.

The composite material produced according to the present invention may be applied to an article or other physical structures by a variety of techniques, such as using adhesives to attach a film bearing the composite material to an article (as a decal or the like) or by hot stamping of a film bearing an composite material or delivering a composite material to an article. Suitable non-limiting techniques for delivering a composite material to an article include providing the composite material in a medium and applying the medium containing the composite material to an article by brushing, spraying, wiping, dipping, sprinkling, electrodepositing, powder spraying, aerosol spraying, slot-die coating, gravure coating, roll coating and printing (such as with an ink jet printer). The composite material may be incorporated into an article by soaking an article with a medium (e.g., solvent or dispersant) containing the composite material, wherein the composite material soaks into and is incorporated into the article. The composite material may be incorporated into threads, such as currency threads that are fixed or received within components of currency paper. Alternatively, the composite material may be compounded into material for producing the article (such as a resinous material or pulp-type material). The article may be molded (including injection-molding) or extruded (including hot melt extrusion), whereby the composite material is co-extruded with the article forming material. The composite material of the present invention may also be provided on or incorporated into heat-shrinkable sleeves for wrapping around articles. Alternatively, the article itself may serve as a substrate by applying the composite material directly to the housing of the article, such as the housing of electronic devices or directly to goods, such as athletic equipment, accessories, optical lenses, optical frames, clothing, including shoes, and the like.

The composite material may be used in marking devices, including documents of value, articles of manufacture, and their packaging and credentials documents. Examples of documents of value include currency, credit cards, compliance certificates, collectors' items and trading cards, deeds, titles or registrations (e.g., automotive), compliance decals, tickets (e.g., travel, events or parking), tax stamps, coins, postage stamps, checks and money orders, stationary, lottery tickets, chips and/or tokens, controlled items (e.g., evidence), key cards, keys, tracing and tracking items, and as a portion of barcodes. Articles of manufacture or packaging of articles of manufacture may include aircraft parts, automotive parts, such as vehicle identification numbers, pharmaceutical products and personal care products, recorded media, clothing and footwear, electronic devices, batteries, ophthalmic devices, alcohol, food items, printing inks and printing consumables, writing implements, luxury items, such as luggage and handbags, sporting goods, software and software packaging, tamper seals, artwork (including original works of art), construction materials, munitions, toys, fuel, industrial equipment, biological materials and living goods, jewelry, books, antiques, safety items (e.g., fire extinguishers and filtration devices), carpets and other furnishings, chemicals, medical devices, paint and coatings, and windows and transparencies. Examples of credentials which may bear the composite material produced according to the present invention include drivers' licenses, identification cards, (government, corporate, and educational) passports, visas, marriage certificates, hospital bracelets and diplomas. These examples are not meant to be limiting and are only a sampling of devices that may bear the composite material of the present invention. These exemplary uses are not meant to be limiting.

The following examples are presented to demonstrate the general principles of the invention. The invention should not be considered as limited to the specific examples presented. All parts are by weight unless otherwise indicated.

EXAMPLES

Example 1

Step 1: UV Curable Organic Matrix

An ultraviolet radiation curable organic composition was prepared via the following procedure. Diphenyl(2,4,6-trimethylbenzoyl) phosphineoxide/2-hydroxy-2-methyl-propiophenone (0.25 g), 50/50 blend from Aldrich Chemical Company, Inc., Milwaukee, Wis., was added with stirring to a mixture of 6 g ethoxylated (20) trimethylol propane triacrylate and 3.5 g of propoxylated neopentyl glycol diacrylate, and 0.5 g of pentaerythritol tetraacrylate, all from Sartomer Company, Inc., Exton, Pa.

Step 2: Color-Shifting, Imaged Crystalline Colloidal Array Film

A crystalline colloidal array (CCA) film without the interstitial spaces filled was prepared in the same manner as described in U.S. Pat. No. 7,682,530 on a polyethylene terephthalate (PET) support film. Material from Step 1 of Example 1 was applied to this film to fill the interstitial spaces. A PET coversheet was applied over the film and UV radiation curable coating was then rolled to spread the UV radiation curable coating to a uniform thickness. The film was heated in a 215° F. oven until a color change was observed when looking at the film from a normal angle (green to orange reflectance). The PET coversheet was removed and the CCA film containing the UV radiation curable composition was affixed CCA side down onto the white background of an opacity chart (byko-chart, BYK-Gardner USA).

An image of a simple shape was printed with an ink jet printer onto a transparency to create a mask. The mask was placed on the backside of the PET substrate supporting the CCA film and the assembly was exposed to UV radiation. The mask was removed and the remaining film was heated for five seconds in a 215° F. oven and then fully cured using UV radiation. The supporting film was then removed, leaving a color-shifting film affixed to the opacity chart.

The area that had been under the transparent portion of the mask, exhibited a decreased reflectance and the color changed from orange to green when viewed at a normal angle to the film (the image). The portions of the film that were under the opaque portion of the mask increased in reflectance and changed in color from orange to red when viewed at a normal angle to the film (the background). The color of the image changed from green to blue by changing the viewing orientation from a normal angle to a glancing angle. The background color changed from red to green by changing the viewing orientation from a normal to a glancing angle.

Example 2

Step 1: UV Radiation Curable Organic Matrix Containing Photochromic Dye

A gray photochromic dye composition was prepared using the crystalline organic dyes PPG Photosol® 0265, PPG Photosol® 5-3, PPG Photosol® 7-106, commercially available from PPG Industries, Inc., Pittsburgh, Pa. The dyes were each added at 0.33 g to 3 g of methyl ethyl ketone to make a homogeneous mixture. The solvent and dye mixture was added to 6 g of the UV radiation curable organic composition from Example 1 in an open container. The container was placed in a 200° F. oven for approximately 1 hour to evaporate the 3 g methyl ethyl ketone. A material balance was used to determine the elimination of methyl ethyl ketone.

Step 2: Color-Shifting, Imaged Crystalline Colloidal Array Film Containing Photochromic Dye A CCA film without the interstitial spaces filled was prepared in the same manner as described in U.S. Pat. No. 7,682,530 on a PET support film. Material from Step 1 of Example 2 was applied to this film to fill the interstitial spaces. A PET coversheet was applied over the film and UV radiation curable coating and was then rolled to spread the UV radiation curable coating to a uniform thickness (green film appearance). The PET coversheet was removed and the CCA film containing the UV radiation curable composition was affixed with the CCA side down onto the white background of an opacity chart (byko-chart, BYK-Gardner USA).

An image of a simple shape was printed with an ink jet printer onto a transparency to create a mask. The mask was placed on the backside of the PET substrate supporting the CCA film and the assembly was exposed to UV radiation. The mask was removed and the remaining film was heated for about 10 seconds in a 215° F. oven until a color change was observed when looking at the film from a normal angle (green to orange reflectance), and then fully cured using UV radiation. The supporting film was then removed, leaving a color-shifting film affixed to the opacity chart.

The area under the transparent portion of the mask exhibited a decreased reflectance and the color changed from orange to green when viewed at a normal angle to the film (the image). The portions of the film that were under the opaque portion of the mask increased in reflectance and changed in color from orange to red when viewed at a normal angle to the film (the background). The color of the image changed from green to blue by changing the viewing orientation from a normal to a glancing angle. The background color changed from red to green by changing the viewing orientation from a normal to a glancing angle. It is more difficult to see the color of a CCA when it is placed over a white background since all wavelengths of the incident light are then reflected back through the CCA, in addition to the wavelengths specifically reflected by the CCA. Upon exposure to ultraviolet radiation, the photochromic dye in the CCA film becomes excited and turns dark gray. The image becomes more visible not just because of the darker surrounding area, but mostly because the wavelengths of light that are not reflected by the CCA go through the CCA and are absorbed by the darkened photochromic dye, so the only light seen is that color specifically reflected by the CCA. When the stimulus was removed, the dye returned to its colorless form.

Example 3

Step 1: Color-Shifting, Imaged Crystalline Colloidal Array Film on a Support

A CCA film without the interstitial spaces filled was prepared in the same manner as described in U.S. Pat. No. 7,682,530 on a PET support film. Material from Step 1 of Example 1 was applied to this film to fill the interstitial spaces. A PET coversheet was applied over the film and UV radiation curable coating and was then rolled to spread the UV radiation curable coating to a uniform thickness. The film was heated in a 215° F. oven until a color change was observed when looking at the film from a normal angle (green to orange reflectance), then placed on an opacity chart (byko-chart, BYK-Gardner USA) with the PET coversheet facing the black background. An image of a simple shape was printed with an ink jet printer onto a transparency to create a mask. The mask was placed on the backside of the PET substrate supporting the CCA film and the assembly was exposed to UV radiation. The mask was removed and the remaining film was heated for five seconds in a 215° F. oven and then fully cured using UV radiation. The PET coversheet was removed, leaving an imaged film affixed to the PET support film.

The area under the transparent portion of the mask exhibited a decreased reflectance and the color change from orange to green when viewed at a normal angle to the film (the image). The portions of the film that were under the opaque portion of the mask increased in reflectance and changed in color from orange to red when viewed at a normal angle to the film (the background). The color of the image changed from red to green by changing the viewing orientation from a normal to a glancing angle. The background color changed from green to blue by changing the viewing orientation from a normal to a glancing angle. The films were cut into shapes measuring 1 by ¾ inch (2.5 by 1.9 cm).

Step 2: Microporous Sheet with Photochromic Coating

Sheets of TESLIN® SP 1000 microporous material measuring 8.5 by 11 inches (21.6 by 27.9 cm) were cut into squares about 4 inches (10.2 cm) on each side. Each sheet was attached to a holder and subjected to oxygen plasma for 1 minute using a Plasmatech machine at a power setting of 100 watts while introducing oxygen at a rate of 100 ml/min into the vacuum chamber of the Plasmatech machine. The plasma treated sheets were spin-coated at 1400 rpm for 7 seconds with a photochromic polyurethane coating of the type described in U.S. Pat. No. 6,187,444 B1 containing a mixture of naphthopyran photochromic materials in proportions designed to give a gray tint to the coating when activated by UV radiation. The photochromic coating was filtered through a 5 micron filter prior to use. The coated sheets were thermally cured at 125° C. for one hour in a forced-air oven. The photochromic polyurethane coatings were approximately 18 to 20 microns thick. Upon exposure to ultraviolet light, the coated sheets demonstrated a light gray color.

Step 3: Imaged CCA Film on Dark Photochromic Support

A few of the photochromic coated sheets prepared in Step 2 of Example 3 were treated with plasma and a second coating of the photochromic polyurethane coating was applied and cured, as described above. Upon exposure to ultraviolet light, the coated sheets demonstrated a dark black color.

A film having an image as prepared in Step 1 of Example 3 was applied using KRAZY® glue to one of the dual coated sheets. The composite was examined before and after exposure to ultraviolet light. After UV irradiation, the image on the imprint became more visible (pronounced) due to the activated photochromic coating producing a darker surrounding area.

The invention claimed is:

1. A composite material comprising:
 a radiation diffracting component comprising a crystalline colloidal array of particles received in a polymer matrix and having fixed inter-particle spacing, said radiation diffracting component exhibiting a diffractive optical effect of reflecting radiation at a constant diffraction wavelength at a constant viewing angle; and
 a photochromic component exhibiting a photochromic optical effect of absorbing radiation, such that the reflected radiation interacts with the absorbed radiation as a combined optical effect, wherein the inter-particle spacing is independent of the radiation absorbed by the photochromic component.

2. The composite material of claim 1, wherein said composite material comprises a multilayer structure having a first layer comprising said radiation diffracting component and a second layer comprising said photochromic component.

3. The composite material of claim 2, wherein said second layer comprises a support and said photochromic component comprises a photochromic coating composition positioned on said support.

4. The composite material of claim 1, wherein said photochromic component is received within said radiation diffracting component.

5. The composite material of claim 4, wherein said photochromic composition is received with said matrix material.

6. The composite material of claim 4, wherein said photochromic composition is received within said particles.

7. The composite material of claim 6, wherein said particles are hollow.

8. The composite material of claim 1, wherein the diffractive optical effect comprises diffraction of radiation by said radiation diffraction component with reflection of a diffraction wavelength in the configuration of an image.

9. The composite material of claim 8, wherein the photochromic optical effect comprises absorbance of radiation by said photochromic component upon activation of said photochromic component.

10. The composite material of claim 9, wherein said photochromic component comprises photochromic material, said photochromic material being activated by exposure to ultraviolet radiation, whereby said photochromic material absorbs visible radiation.

11. The composite material of claim 10, wherein the diffractive optical effect comprises reflection by said radiation diffraction component at a first wavelength without absorbance of the first wavelength of radiation by said photochromic composition.

12. The composite material of claim 11, wherein said image is not visible.

13. The composite material of claim 10, wherein the photochromic optical effect comprises absorbance of a second wavelength of radiation by said photochromic component.

14. The composite material of claim 13, wherein said image is visible.

15. A security device comprising:
a radiation diffracting component comprising a crystalline colloidal array of particles received in a matrix and having fixed inter-particle spacing, said radiation diffracting component exhibiting a diffractive optical effect of reflecting radiation at a constant diffraction wavelength at a constant viewing angle; and
a photochromic component exhibiting a photochromic effect of absorbing radiation, wherein the appearance of radiation reflected by said radiation diffracting component is affected by absorbance of radiation by said photochromic component and wherein the inter-particle spacing is independent of the radiation absorbed by the photochromic component.

16. The security device of claim 15, wherein said radiation diffracting component comprises an image that is visible when said photochromic component absorbs radiation.

17. The security device of claim 16, wherein said photochromic component comprises a support bearing a photochromic coating composition and said radiation diffracting component is positioned overlying said photochromic component.

18. The security device of claim 15, wherein said radiation diffracting component comprises an image that is invisible when said photochromic component absorbs radiation.

19. The security device of claim 18, wherein said photochromic component is provided in a layer overlying said radiation diffracting component and further comprising a light absorbing layer underlying said radiation diffracting component, such that said radiation diffracting component exhibits an image, and wherein upon activation of said photochromic composition, said photochromic composition absorbs radiation and the image is masked by the absorbance of radiation by said photochromic component.

20. The security device of claim 15, further comprising a support film.

21. The security device of claim 15, further comprising a pair of support films sandwiching said radiation diffracting component and photochromic component.

22. An article bearing the security device of claim 15.

23. The article of claim 22, wherein the article comprises a document of value, an article of manufacture, or a credentials document.

24. A method of authenticating an article comprising:
applying a composite material to the article, wherein the composite material includes (i) a first component that diffracts radiation and comprises a crystalline colloidal array of particles received in a matrix, said first component having fixed inter-particle spacing and exhibiting a diffractive optical effect of reflecting radiation at a constant diffraction wavelength at a constant viewing angle and (ii) a second component that is photochromic and exhibits a photochromic effect of absorbing radiation, such that the reflected radiation interacts with the absorbed radiation as a combined optical effect, wherein the inter-particle spacing is independent of the radiation absorbed by the photochromic component, the composite material bearing an image;
exposing the article bearing the composite material to a first wavelength such that the radiation diffracting component exhibits a diffractive optical effect; and
exposing the article bearing the composite material to ultraviolet radiation, such that the photochromic component exhibits a photochromic optical effect, whereby the image in the composite material changes.

25. The method of claim 24, wherein the photochromic component absorbs light at an absorbance wavelength upon exposure to the ultraviolet radiation.

26. The method of claim 25, wherein the image is not visible upon exposure of the composite material to the first wavelength and becomes visible upon exposure of the composite material to ultraviolet radiation.

27. The method of claim 25, wherein the image is not visible when the composite material is exposed to the first wavelength and at least partially disappears when the composite material is exposed to ultraviolet radiation.

* * * * *